US012548898B2

(12) United States Patent
Liu et al.

(10) Patent No.: US 12,548,898 B2
(45) Date of Patent: Feb. 10, 2026

(54) ANTENNA AND ELECTRONIC DEVICE

(71) Applicant: BOE Technology Group Co., Ltd., Beijing (CN)

(72) Inventors: Jianxing Liu, Beijing (CN); Shiyu Zhang, Beijing (CN); Zhuofan Jiao, Beijing (CN); Mengxia Yu, Beijing (CN); Jianyun Zhao, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 121 days.

(21) Appl. No.: 18/637,292

(22) Filed: Apr. 16, 2024

(65) Prior Publication Data

US 2024/0347908 A1 Oct. 17, 2024

Related U.S. Application Data

(63) Continuation of application No. PCT/CN2023/085561, filed on Mar. 31, 2023.

(51) Int. Cl.
*H01Q 3/36* (2006.01)
*H01P 1/18* (2006.01)
(Continued)

(52) U.S. Cl.
CPC ............... *H01Q 3/34* (2013.01); *H01Q 1/422* (2013.01)

(58) Field of Classification Search
CPC .. H01Q 1/24; H01Q 1/38; H01Q 1/42; H01Q 1/422; H01Q 3/34; H01Q 3/26;
(Continued)

(56) References Cited

U.S. PATENT DOCUMENTS 6,538,603 B1 * 3/2003 Chen ........................ H01Q 3/36 342/372
9,640,867 B2 * 5/2017 Behdad ................ H01Q 15/148
(Continued)

FOREIGN PATENT DOCUMENTS

CN 110824735 A 2/2020
CN 112490645 A 3/2021
(Continued)

OTHER PUBLICATIONS

PCT/CN2023/085561 international search report dated Dec. 27, 2023.

*Primary Examiner* — Tho G Phan
(74) *Attorney, Agent, or Firm* — IPro, PLLC

(57) ABSTRACT

Provided is an antenna. The antenna includes: at least one phase-shifting structure, a first reference electrode layer, and a feed substrate; wherein each of the at least one phase-shifting structure includes a first dielectric substrate, a second dielectric substrate, a first electrode layer, a second electrode layer, and a tunable dielectric layer; a first via is defined in the first reference electrode layer; the feed substrate includes a first dielectric layer and a feed structure, and a second via is defined in the first dielectric layer; and the antenna further includes a conductive member, wherein the feed structure includes a main circuit and at least one branch circuit, one of the at least one branch circuit is electrically connected to the conductive member, the conductive member is electrically connected to the first electrode layer through the first via, the second via, and a third via.

20 Claims, 19 Drawing Sheets

(51) Int. Cl.
*H01Q 1/42* (2006.01)
*H01Q 3/34* (2006.01)

(58) Field of Classification Search
CPC .... H01Q 3/36; H01Q 3/44; H01P 1/18; H01P 1/185; H01P 3/12
See application file for complete search history.

(56) References Cited

U.S. PATENT DOCUMENTS

| | | | | |
|---|---|---|---|---|
| 11,121,441 | B1 * | 9/2021 | Rmili | H01Q 21/0043 |
| 12,155,105 | B2 * | 11/2024 | Woods, Jr. | G02F 1/025 |
| 12,334,655 | B2 * | 6/2025 | Wang | H01Q 21/065 |
| 12,381,318 | B2 * | 8/2025 | Raeesi | H01Q 3/30 |
| 2021/0080765 | A1 | 3/2021 | Hu et al. | |

FOREIGN PATENT DOCUMENTS

| | | | |
|---|---|---|---|
| CN | 112768851 | A | 5/2021 |
| CN | 114530692 | A | 5/2022 |
| CN | 114830433 | A | 7/2022 |

* cited by examiner

ANTENNA AND ELECTRONIC DEVICE

CROSS-REFERENCE TO RELATED APPLICATION

This application is a continuation application of international application No. PCT/CN2023/085561, filed on Mar. 31, 2023, the disclosure of which is herein incorporated by reference in its entirety.

TECHNICAL FIELD

The present disclosure relates to the field of antenna technologies, in particular to an antenna and an electronic device.

BACKGROUND

Phased array antennas are antennas that change shapes of patterns by controlling feed phases of radiation units in the array antennas. A direction of a maximum value of the antenna pattern is changed by controlling the phase to achieve beam scanning.

SUMMARY

In some embodiments of the present disclosure, technical solutions of an antenna are provided to solve the technical problems of the present disclosure. The antenna includes: at least one phase-shifting structure, a first reference electrode layer, and a feed substrate, wherein each of the at least one phase-shifting structure includes a first dielectric substrate and a second dielectric substrate that are opposite to each other, and a first electrode layer, a second electrode layer, and a tunable dielectric layer that are disposed between the first dielectric substrate and the second dielectric substrate, wherein the tunable dielectric layer is disposed between the first electrode layer and the second electrode layer;

- the first reference electrode layer is disposed on a side, facing away from the tunable dielectric layer, of the first dielectric substrate, and a first via is defined in the first reference electrode layer;
- the feed substrate includes a first dielectric layer and a feed structure, wherein the first dielectric layer is disposed on a side, facing away from the tunable dielectric layer, of the first reference electrode layer, the feed structure is disposed on side, facing away from the first reference electrode layer, of the first dielectric layer, and a second via extending through in a thickness direction of the first dielectric layer is defined in the first dielectric layer; and
- the antenna further includes a conductive member, wherein the feed structure includes a main circuit and at least one branch circuit electrically connected to the main circuit, one of the at least one branch circuit is electrically connected to the conductive member, the conductive member is electrically connected to the first electrode layer through the first via, the second via, and a third via, wherein the third via extends through at least part of a thickness of the first dielectric substrate in a thickness direction of the first dielectric substrate.

In some embodiments, the third via extends through the first dielectric substrate, the first electrode layer is disposed on a side, proximal to the tunable dielectric layer, of the first dielectric substrate, and the conductive member is directly connected to the first electrode layer by extending through the first via, the second via, and the third via.

In some embodiments, the third via extends through a part of the first dielectric substrate, the first electrode layer is disposed on a side, proximal to the tunable dielectric layer, of the first dielectric substrate, and the conductive member is coupled to the first electrode layer by extending through the first via, the second via, and the third via.

In some embodiments, in a depth direction of the third via, a thickness of a portion of the first dielectric substrate not extended through by the third via ranges from 1.5 μm to 2.5 μm.

In some embodiments, the branch circuit includes a first body portion and a first end portion electrically connected to the conductive member, and the first electrode layer includes a second body portion and a second end portion electrically connected to the conductive member, wherein

- a width of a section of the first end portion perpendicular to the first dielectric substrate decreases monotonically in a direction from the first body portion to the first end portion; or
- a width of a section of the second end portion perpendicular to the first dielectric substrate decreases monotonically in a direction from the second body portion to the second end portion.

In some embodiments, an orthogonal projection of the first end portion on the first dielectric substrate covers an orthogonal projection of the conductive member on the first dielectric substrate, and an outline of the orthogonal projection of the conductive member on the first dielectric substrate falls within an outline of the orthogonal projection of the first end portion on the first dielectric substrate; or

- an orthogonal projection of the second end portion on the first dielectric substrate covers an orthogonal projection of the conductive member on the first dielectric substrate, and an outline of the orthogonal projection of the conductive member on the first dielectric substrate falls within an outline of the orthogonal projection of the second end portion on the first dielectric substrate.

In some embodiments, an orthogonal projection of each of the at least one branch circuit on the first dielectric substrate covers an orthogonal projection of the conductive member on the first dielectric substrate, and an orthogonal projection of the first electrode layer on the first dielectric substrate covers the orthogonal projection of the conductive member on the first dielectric substrate; and

- for a remaining portion, other than a portion connected to the main circuit, of the each of the at least one branch circuit, a width of a section of the remaining portion perpendicular to the first dielectric substrate is uniform, or, a width of a section of the first electrode layer perpendicular to the first dielectric substrate is uniform.

In some embodiments, the conductive member includes a first conductive portion and a second conductive portion that are electrically connected, wherein the first conductive portion is disposed in the third via of the first dielectric substrate, the second conductive portion is disposed in the first via and the second via, and

- a width of a section of the first conductive portion perpendicular to the first dielectric substrate increases monotonically in a direction from the second dielectric substrate to the first dielectric substrate.

In some embodiments, the first conductive portion includes a first surface and a second surface that are opposite to each other in a thickness direction of the first conductive portion, wherein the first surface is closer to the first dielectric substrate than the second surface,

- an orthogonal projection of the second surface on the first dielectric substrate covers an orthogonal projection of the first surface on the first dielectric substrate, and a proportion of an area of the first surface and an area of the second surface ranges from 0.125 to 0.375.

In some embodiments, the second conductive portion includes a third surface and a fourth surface that are opposite to each other in a thickness direction of the second conductive portion, wherein the third surface is closer to the first conductive portion than the fourth surface, the third surface is connected to the second surface, and an orthogonal projection of the third surface is coincident with the orthogonal projection of the second surface.

In some embodiments, the conductive member includes a first conductive portion and a second conductive portion that are electrically connected, wherein the first conductive portion is disposed in the third via of the first dielectric substrate, the second conductive portion is disposed in the first via and the second via, and a width of a section of the first conductive portion perpendicular to the first dielectric substrate decreases monotonically in a direction from the second dielectric substrate to the first dielectric substrate.

In some embodiments, the first conductive portion includes a first surface and a second surface that are opposite to each other in a thickness direction of the first conductive portion, wherein the first surface is closer to the first dielectric substrate than the second surface, an orthogonal projection of the first surface on the first dielectric substrate covers an orthogonal projection of the second surface on the first dielectric substrate, and a proportion of an area of the second surface and an area of the first surface ranges from 0.125 to 0.375.

In some embodiments, the second conductive portion includes a third surface and a fourth surface that are opposite to each other in a thickness direction of the second conductive portion, wherein the third surface is closer to the first conductive portion than the second surface, the third surface is connected to the second surface, and an orthogonal projection of the third surface on the first dielectric substrate covers the orthogonal projection of the second surface on the first dielectric substrate.

In some embodiments, the conductive member includes a first conductive portion and a second conductive portion that are electrically connected, wherein the first conductive portion is disposed in the third via of the first dielectric substrate, the second conductive portion is disposed in the first via and the second via, the first conductive portion includes a first conductive sub-portion and a second conductive sub-portion, and the first conductive portion is closer to the first electrode layer than the second conductive portion, wherein a width of a section of the first conductive sub-portion perpendicular to the first dielectric substrate decreases monotonically in a direction from the second dielectric substrate to the first dielectric substrate, or a width of a section of the second conductive sub-portion perpendicular to the first dielectric substrate increases monotonically in a direction from the second dielectric substrate to the first dielectric substrate.

In some embodiments, the first conductive sub-portion includes a first surface and a fifth surface that are opposite to each other in a thickness direction of the first conductive sub-portion, wherein the first surface is closer to the first dielectric substrate than the fifth surface; and the second conductive sub-portion includes a sixth surface and a second surface that are opposite to each other in a thickness direction of the second conductive sub-portion, wherein the sixth surface is closer to the first dielectric substrate than the second surface; wherein an orthogonal projection of the first surface on the first dielectric substrate covers an orthogonal projection of the fifth surface on the first dielectric substrate, and a proportion of an area of the fifth surface and an area of the first surface ranges from 0.125 to 0.375; or an orthogonal projection of the second surface on the first dielectric substrate covers an orthogonal projection of the sixth surface on the first dielectric substrate, and a proportion of an area of the sixth surface and an area of the second surface ranges from 0.125 to 0.375.

In some embodiments, the second conductive portion includes a third surface and a fourth surface that are opposite to each other in a thickness direction of the second conductive portion, wherein the third surface is closer to the first conductive portion than the fourth surface, the third surface is connected to the second surface, and an orthogonal projection of the third surface is coincident with the orthogonal projection of the second surface.

In some embodiments, the feed substrate further includes a second dielectric layer on a side, facing away from the first dielectric layer, of the feed structure and a second reference electrode layer on a side, facing away from the feed structure, feed the second dielectric layer, wherein an orthogonal projection of the first reference electrode layer on the first dielectric substrate is not overlapped with an orthogonal projection of the feed structure on the first dielectric substrate.

In some embodiments, the feed substrate further includes a third dielectric layer, a connection portion, and a feed source, wherein the third dielectric layer is disposed on a side, facing away from the second dielectric layer, of the second reference electrode layer, and a fourth via is defined in the third dielectric layer; the feed source is disposed in the fourth via, and is electrically connected to the connection portion; and the connection portion is electrically connected to the main circuit by extending through a fifth via in the second reference electrode layer and a sixth via in the second dielectric layer.

In some embodiments, a width of the first via is greater than a width of the conductive member, and a width of the second via and a width of the third via are equal to the width of the conductive member.

In some embodiments of the present disclosure further provide an electronic device. The electronic device includes the antenna in any of the above embodiments.

Figure 1A:
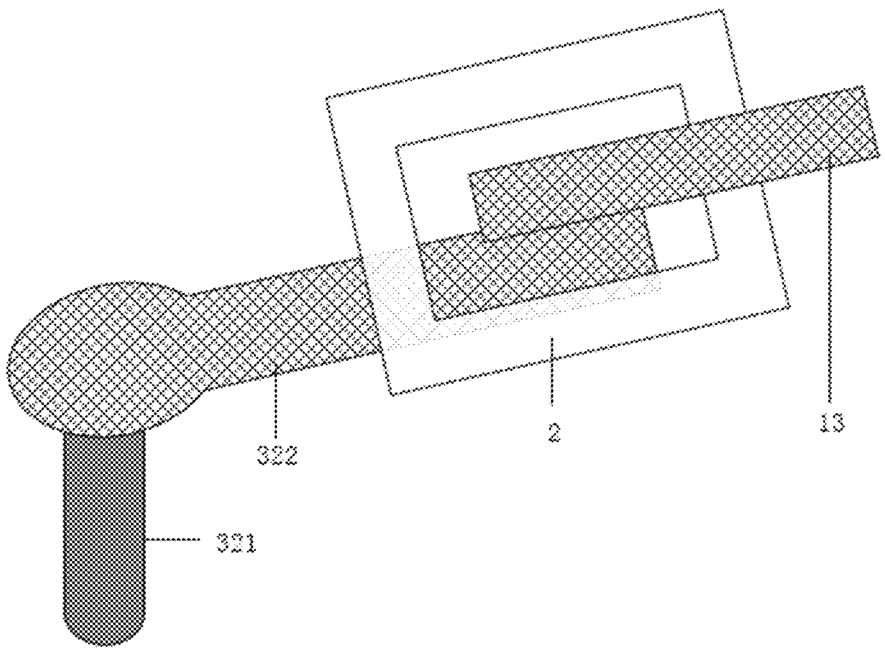
FIG. 1*a* is a stereoscopic diagram of a liquid crystal phased array antenna in some practices.

Reference numerals and denotations thereof:

1—phase-shifting structure; 11—first dielectric substrate; 12—second dielectric substrate; 13—first electrode layer; 14—second electrode layer; 15—tunable dielectric layer; 13-1—second body portion; 13-2—second end portion;

2—first reference electrode layer; Via1—first via;

3—feed substrate; 31—first dielectric layer; 32—feed structure; 33—second dielectric layer; 34—second reference electrode layer; 35—connection portion; 36—feed source; 321—main circuit; 322—branch circuit; 322-1—first body portion; 322-2—first end portion; 3221—remaining portion; 37—third dielectric layer; 38—reflective layer; Via2—second via; Via3—third via; Via4—fourth via; Via 5—fifth via; Via6—sixth via; Via7—seventh via; Via8—eighth via;

4—conductive member; 41—first conductive portion; 42—second conductive portion; 411—first conductive sub-portion; 412—second conductive sub-portion; 401—first surface; 402—second surface; 403—third surface; 404—fourth surface; 405—fifth surface; 406—sixth surface;

5—package structure.

DETAILED DESCRIPTION

For clearer descriptions of the objects, technical solutions, and advantages of the embodiments of present disclosure, the technical solutions of the embodiments of the present disclosure are described clearly and completely hereinafter in combination with the accompanying drawings in the embodiments of the present disclosure. It is obvious that the described embodiments are merely part but not all of the embodiments of the present disclosure. Generally, assemblies of the embodiments of the present disclosure described and shown in the accompanying drawings herein can be arranged and designed in various configurations. Thus, detailed descriptions of the embodiments of the present disclosure in the accompanying drawings hereinafter are not intended to limit the claimed protection scope, and only represent the specific embodiments of the present disclosure. All other embodiments derived by those skilled in the art without creative efforts based on the embodiments in the present disclosure are within the protection scope of the disclosure.

It should be noted that unless otherwise defined, technical or scientific terms used in the embodiments of the present disclosure shall have ordinary meaning understood by persons of ordinary skill in the art to which the disclosure belongs. The terms “first,” “second,” and the like used in the embodiments of the present disclosure are not intended to indicate any order, quantity or importance, but are merely used to distinguish the different components. The terms “a,” “an,” and the like are not intended to limit the quantity, and only represent that at least one exists. The terms “comprise” or “include” and the like are used to indicate that the element or object preceding the terms covers the element or object following the terms and its equivalents, and shall not be understood as excluding other elements or objects. The terms “connect” or “contact” and the like are not intended to be limited to physical or mechanical connections, but may include electrical connections, either direct or indirect connection. The terms “on,” “under,” “left,” and “right” are only used to indicate the relative positional relationship. When the absolute position of the described object changes, the relative positional relationship may change accordingly.

The term “a plurality of or several” herein means two or more. The term “and/or” describes associations between associated objects, and indicates three types of relationships. For example, “A and/or B” indicates that A alone, A and B, or B alone. The character “/” generally indicates that the associated objects are in an “or” relationship.

Figure 1B:
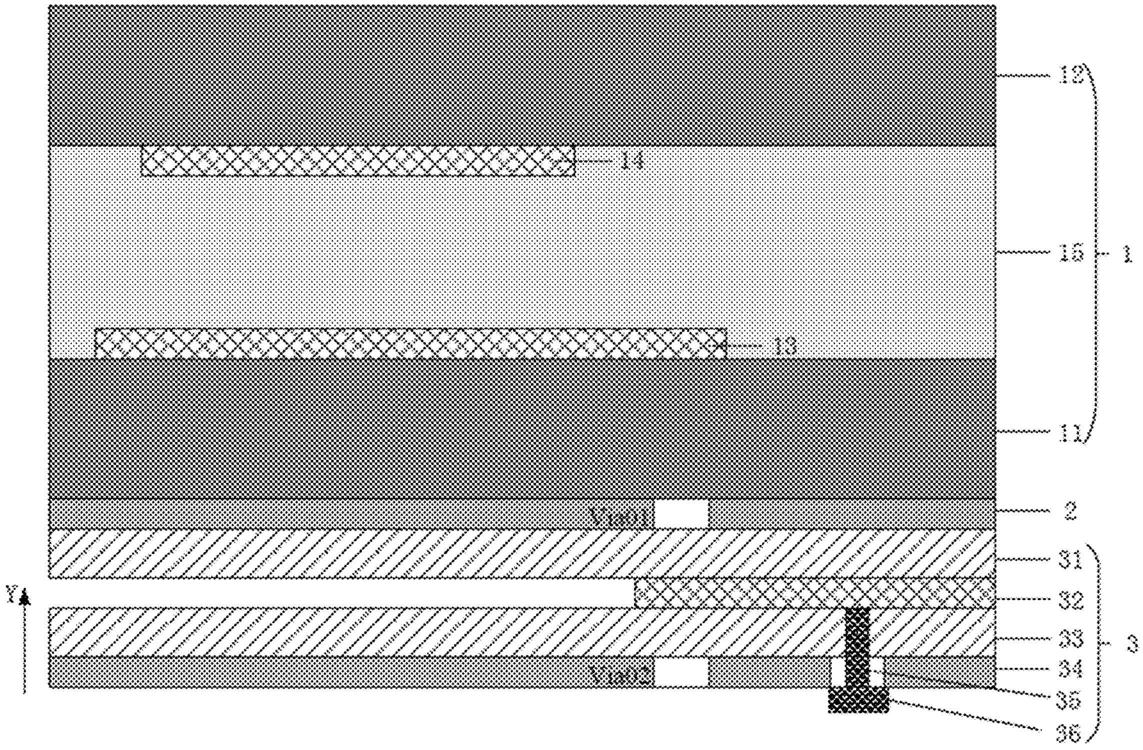
FIG. 1*b* is a schematic diagram of film layers of a liquid crystal phased array antenna in some practices.

In the field of liquid crystal phased array antenna, the lead feed is generally difficult due to the liquid crystal boxes, and thus a feed mode of the liquid crystal phased array antenna is generally coupling feed. However, the coupling feed requires large space, loss of coupled structure is great, and the acquired device is limited in volume, weight, and transmission performance. FIG. 1*a* is a stereoscopic diagram of a liquid crystal phased array antenna in some practices. FIG. 1*b* is a schematic diagram of film layers of a liquid crystal phased array antenna in some practices. As shown in FIG. 1*a* and FIG. 1*b*, the liquid crystal phased array antenna includes at least one phase-shifting structure 1, a first reference electrode layer 2, and a feed substrate 3. The phase-shifting structure 1 includes a first dielectric substrate 11 and a second dielectric substrate 12 that are opposite to each other, and a first electrode layer 13, a second electrode layer 14, and a tunable dielectric layer 15 that are disposed between the first dielectric substrate 11 and the second dielectric substrate 12. The tunable dielectric layer 15 is disposed between the first electrode layer 13 and the second electrode layer 14, and the first reference electrode layer 2 is disposed on a side, facing away from the tunable dielectric layer 15, of the first dielectric substrate 11. The feed substrate 3 includes a first dielectric layer 31, a feed structure 32, a second dielectric layer 33, a second reference electrode layer 34, and a feed source 36 that are sequentially disposed on a side, facing away from the tunable dielectric layer 15, of the first reference electrode layer 2. A first via Via01 is defined in the first reference electrode layer 2, a second via Via02 is defined in the second reference electrode layer 34, and an orthogonal projection of the first via Via01 on the first dielectric substrate 11 is at least partially overlapped with an orthogonal projection of the second via Via02 on the first dielectric substrate 11. The feed source 36 transmits signals to the feed structure 32 through the connection portion 35, and the feed structure 32 feeds back the signals to the first electrode layer 13 through the first via Via01 and the second via Via02 in a slot-coupling mode.

Figure 2:
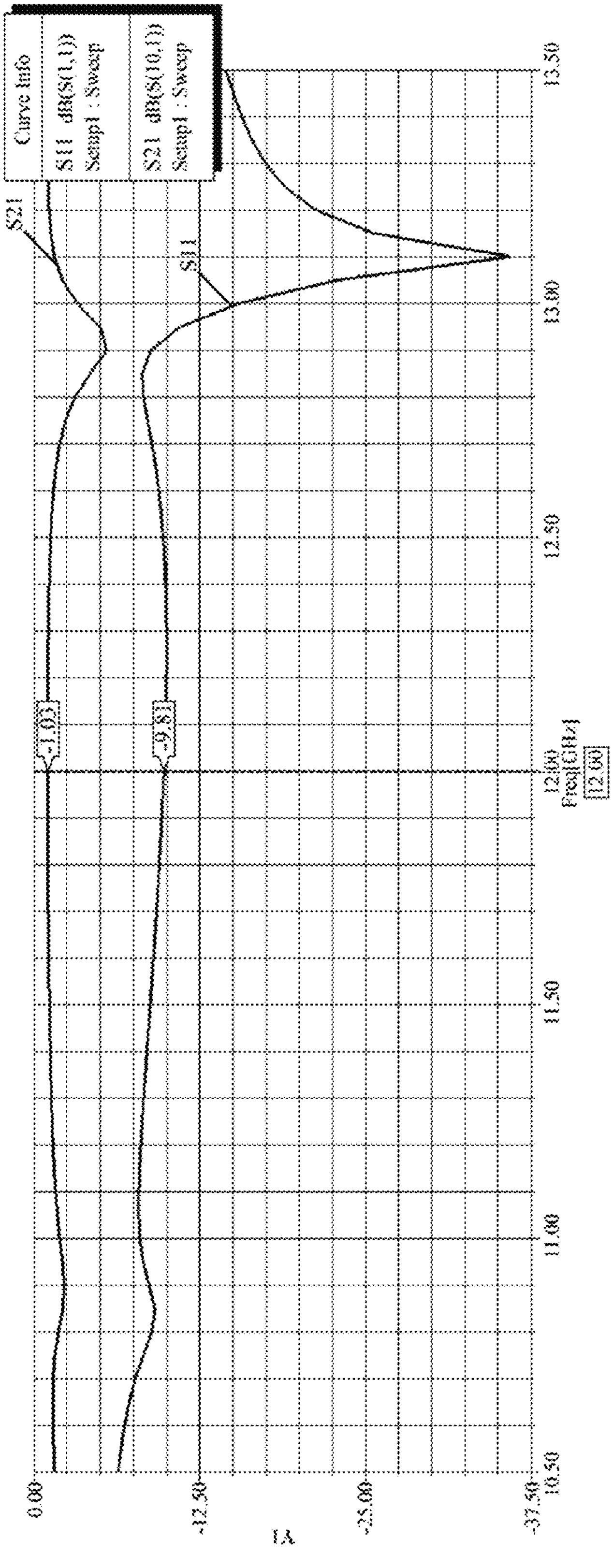
FIG. 2 is a simulation diagram of a parameter S in the structure shown in FIG. 1.

FIG. 2 is a simulation diagram of a parameter S in the structure shown in FIG. 1. The parameter S is a scattering parameter, which is an important parameter in microwave transmission. S11 represents input of a reflection parameter, that is, input of return loss. S21 represents insert loss. As shown in FIG. 2, the abscissa represents a radiation frequency of a signal, and the ordinate represents the parameter S. It can be seen from the simulation result in FIG. 2 that at the resonance point 12 GHz, S11 is equal to −9.81 dB, and S21 is equal to −1.03 dB. Thus, in the case that the feed in the liquid crystal phased array antenna is performed in the feed method in FIG. 1*b*, the energy transmission performance is slightly poor, and the coupling loss is 1.03 dB.

Thus, the embodiments of the present disclosure provide an antenna, which solve one or more problems caused by limitations and defects in some practices. The antenna in the embodiments of the present disclosure includes at least one phase-shifting structure 1, a first reference electrode layer 2, and a feed substrate 3. The phase-shifting structure 1 includes a first dielectric substrate 11 and a second dielectric substrate 12 that are opposite to each other, and a first electrode layer 13, a second electrode layer 14, and a tunable dielectric layer 15 that are disposed between the first dielectric substrate 11 and the second dielectric substrate 12. The tunable dielectric layer 15 is disposed between the first electrode layer 13 and the second electrode layer 14. The first reference electrode layer 2 is disposed on a side, facing away from the tunable dielectric layer 15, of the first dielectric substrate 11, and a first via Via1 is defined in the first reference electrode layer 2. The feed substrate 3 includes a first dielectric layer 31 and a feed structure 32. The first dielectric layer 31 is disposed on a side, facing away from the tunable dielectric layer 15, of the first reference electrode layer 2, the feed structure 32 is disposed on side, facing away from the first reference electrode layer 2, of the first dielectric layer 31, and a second via Via2 extending through in a thickness direction of the first dielectric layer 31 is defined in the first dielectric layer 31. The antenna further includes a conductive member 4. The feed structure 32 includes a main circuit 321 and at least one branch circuit 322 electrically connected to the main circuit 321. One of the at least one branch circuit 322 is electrically connected to the conductive member 4, the conductive member 4 is electrically connected to the first electrode layer 13 through the first via Via1, the second via Via2, and a third via Via3. The third via Via3 extends through at least part of a thickness of the first dielectric substrate 11 in a thickness direction of the first dielectric substrate 11. In the embodiments of the present disclosure, the feed structure 32 is connected to the first electrode layer 13 through the conductive member 4, such that the energy transmission performance is efficiently improved, and the insert loss is reduced.

Figure 3:
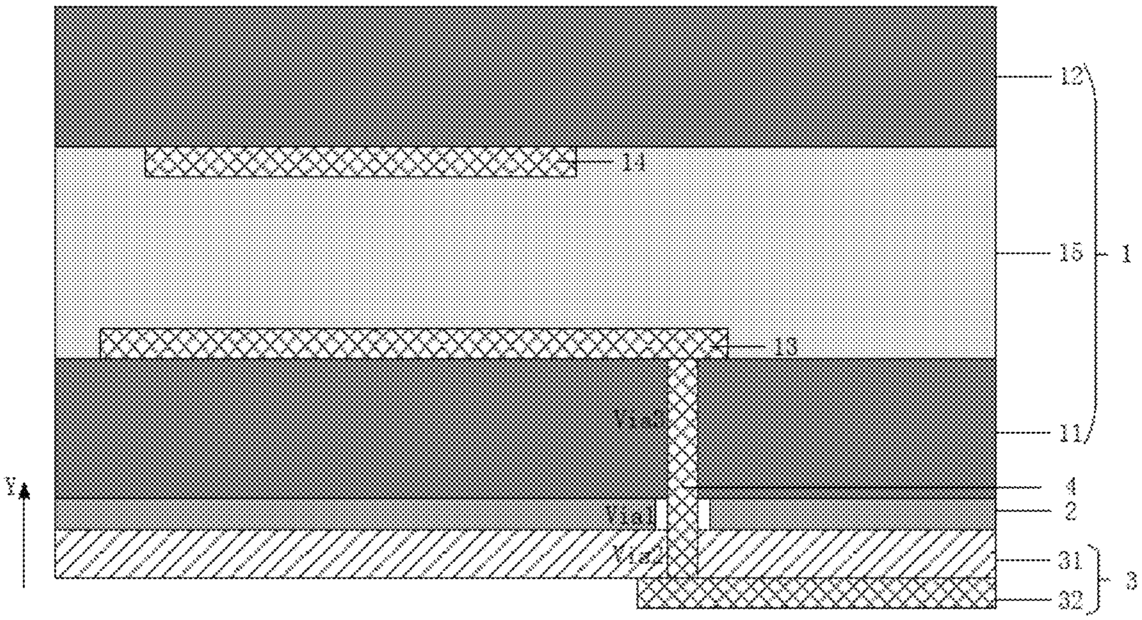
FIG. 3 is a schematic diagram of film layers of an antenna according to some embodiments of the present disclosure.

The detailed structure of the antenna in the embodiments of the present disclosure is described hereinafter. FIG. 3 is a schematic diagram of film layers of an antenna according to some embodiments of the present disclosure. As shown in FIG. 3, the antenna includes at least one phase-shifting structure 1, a first reference electrode layer 2, and a feed substrate 3. The phase-shifting structure 1 includes a first dielectric substrate 11 and a second dielectric substrate 12 that are opposite to each other, and a first electrode layer 13, a second electrode layer 14, and a tunable dielectric layer 15 that are disposed between the first dielectric substrate 11 and the second dielectric substrate 12. The tunable dielectric layer 15 is disposed between the first electrode layer 13 and the second electrode layer 14. Illustratively, the antenna in the embodiments of the present disclosure is a liquid crystal phased array antenna, and the tunable dielectric layer 15 is a liquid crystal layer. The liquid crystal deflection is achieved based on the first electrode layer 13 and the second electrode layer 14 on two sides of the liquid crystal to achieve the phase shift.

As shown in FIG. 3, the first reference electrode layer 2 is disposed on a side, facing away from the tunable dielectric layer 15, of the first dielectric substrate 11, and a first via Via1 is defined in the first reference electrode layer 2. The feed substrate 3 includes a first dielectric layer 31 and a feed structure 32. The first dielectric layer 31 is disposed on a side, facing away from the tunable dielectric layer 15, of the first reference electrode layer 2, the feed structure 32 is disposed on side, facing away from the first reference electrode layer 2, of the first dielectric layer 31, and a second via Via2 extending through in a thickness direction of the first dielectric layer 31 is defined in the first dielectric layer 31. The antenna further includes a conductive member 4. The feed structure 32 includes a main circuit 321 and at least one branch circuit 322 electrically connected to the main circuit 321. One of the at least one branch circuit 322 is electrically connected to the conductive member 4, the conductive member 4 is electrically connected to the first electrode layer 13 through the first via Via1, the second via Via2, and a third via Via3. The third via Via3 extends through at least part of a thickness of the first dielectric substrate 11 in a thickness direction of the first dielectric substrate 11.

Illustratively, the third via Via3 completely extends through the first dielectric substrate 11 in the thickness direction of the first dielectric substrate 11, and in this case, the conductive member 4 feeds back the signals to the first electrode layer 13 due to a direct connection. Alternatively, the third via Via3 extends through part of the first dielectric substrate 11 in the thickness direction of the first dielectric substrate 11, and in this case, the conductive member 4 feeds back the signals to the first electrode layer 13 by the transmission through the conductive member 4 and the slot-coupling mode. The signals are feed back to the first electrode layer 13 through the conductive member 4 in the above methods, such that the energy transmission performance is efficiently improved, and the feed loss is reduced.

Illustratively, as shown in FIG. 3, in the embodiments of the present disclosure, one layer of the first dielectric layer 31 is disposed to separate the feed structure 32 and the first reference electrode layer 2, and the feed is achieved through the conductive member 4. Compared with the coupled feed (the structure shown in FIG. 1) in some practices, settings of several layers of the reference electrode layers and the dielectric layers are reduced, and unnecessary via processes are avoided, such that the layout space of the structure is greatly saved, and the antenna is more miniaturized and lightweight.

Illustratively, the feed structure 32 is a power divider for "dividing one into several", that is, one main circuit 321 and a plurality of branch circuits 322. Each branch circuit 322 corresponds to one phase-shifting structure 1.

Illustratively, the first via Via1, the second via Via2, and the third via Via3 are circular vias. Preferably, the first via Via1, the second via Via2, and the third via Via3 are parallel to a concentric co-axis of any section of the first dielectric substrate 11. Preferably, the first via Via1 extends through the first reference electrode layer 2 in the thickness direction of the first reference electrode layer 2, and an extension direction of the first via Via1 is perpendicular to the second dielectric substrate 12. The second via Via2 extends through the first dielectric layer 31 in the thickness direction of the first dielectric layer 31, and an extension direction of the second via Via2 is perpendicular to the second dielectric substrate 12. The third via Via3 extends through the first dielectric substrate 11 in the thickness direction of the first dielectric substrate 11, and an extension direction of the third via Via3 is perpendicular to the second dielectric substrate 12. Thus, it is convenient to manufacture the vertical conductive member 4, and the term "vertical" indicates an extension direction of the conductive member 4 is perpendicular to the second dielectric substrate 12. By disposing the relatively vertical conductive member 4, the layout space of lateral structure is greatly saved compared with the coupled structure in some practices, and thus the development trend of small device, light weight, and high performance is met.

In some embodiments, a width of the first via Via1 is greater than a width of the conductive member 4, and a width of the second via Via2 and a width of the third via Via3 are equal to the width of the conductive member 4. Illustratively, the first via Via1, the second via Via2, and the third via Via3 are circular vias, a diameter of the first via Via1 is greater than a diameter of the second via Via2, and the diameter of the first via Via1 is greater than a diameter of the third via Via3. A conductive pillar is completely filled in the second via Via2 and the third via Via3, and the conductive pillar is separated from the first reference electrode layer 2 through the first via Via1 to prevent energy leakage. An outline of an orthogonal projection of the first via Via1 on the first dielectric substrate 11 is looped on an outline of an orthogonal projection of the second via Via2 on the first dielectric substrate 11, and a distance between the orthogonal projections is less than 1 mm.

Illustratively, the tunable dielectric layer 15 is disposed between the first electrode layer 13 and the second electrode layer 14. In some embodiments, the first electrode layer 13 is disposed on a side, proximal to the tunable dielectric layer 15, of the first dielectric substrate 11. In some embodiments, the first electrode layer 13 is disposed on a side, proximal to the tunable dielectric layer 15, of the second dielectric substrate 12. FIG. 3 only shows the case that the first electrode layer 13 is disposed on the side, proximal to the tunable dielectric layer 15, of the first dielectric substrate 11.

Illustratively, the first electrode layer 13 is a coplanar waveguide (CPW) structure, and a material of the first electrode layer includes, but is not limited to copper (Cu). The first dielectric substrate 11 is a glass substrate, is disposed in the third via Via3 on the glass substrate, and is formed by glass punching. The third via Via3 extends through the glass substrate is formed by the through glass via (TGV) technology. Illustratively, a thickness of the glass substrate ranges from 0.45 mm to 0.55 mm, for example, 0.5 mm.

In some embodiments, as shown in FIG. 3, the third via Via3 extends through the first dielectric substrate 11, the first electrode layer 13 is disposed on a side, proximal to the tunable dielectric layer 15, of the first dielectric substrate 11, and the conductive member 4 is directly connected to the first electrode layer 13 by extending through the first via Via1, the second via Via2, and the third via Via3. The direct connection here indicates that the conductive member 4 is in seamless contact with the first electrode layer 13, such that the energy input performance is improved by the feed mode of the direct connection of the conductive member 4, and the insert loss is reduced.

Figure 4:
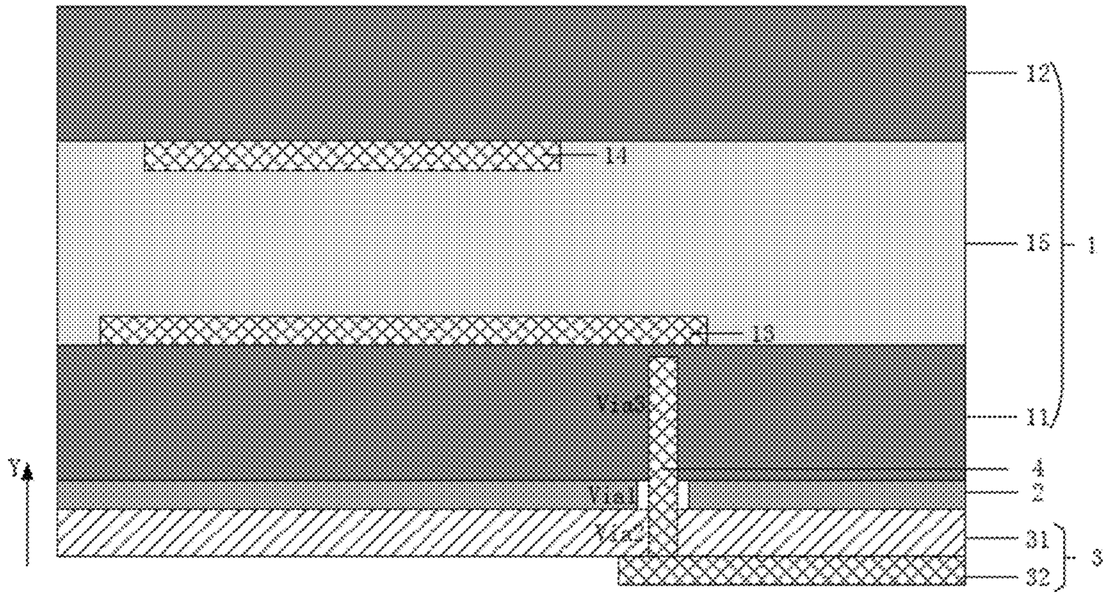
FIG. 4 is a schematic diagram of film layers of an antenna according to some embodiments of the present disclosure.

In some embodiments, FIG. 4 is a schematic diagram of film layers of an antenna according to some embodiments of the present disclosure. As shown in FIG. 4, the third via Via3 extends through a part of the first dielectric substrate 11, the first electrode layer 13 is disposed on a side, proximal to the tunable dielectric layer 15, of the first dielectric substrate 11, and the conductive member 4 is coupled to the first electrode layer 13 by extending through the first via Via1, the second via Via2, and the third via Via3. The coupled connection here indicates that the conductive member 4 is not in contact with the first electrode layer 13, and the conductive member 4 is separated from the first electrode layer 13 through the first dielectric substrate 11, such that the energy input performance is improved by the transmission and coupling of the conductive member 4, and the insert loss is reduced.

In some embodiments, in conjunction with the above embodiments, as shown in FIG. 4, in a depth direction of the third via Via3, a thickness of a portion of the first dielectric substrate 11 not extended through by the third via Via3 ranges from 1.5 μm to 2.5 μm.

In some embodiments, the third via Via3 extends through the first dielectric substrate 11, the first electrode layer 13 is disposed on the side, proximal to the tunable dielectric layer 15, of the first dielectric substrate 11, and the conductive member 4 is coupled to the first electrode layer 13 by extending through the first via Via1, the second via Via2, and the third via Via3. The coupled connection here indicates that a gap is present between the conductive member 4 and the first electrode layer 13 (that is, a portion in the second via Via2 not filled by the conductive member 4), and the conductive member 4 is separated from the first electrode layer 13 through the first dielectric substrate 11, such that the energy input performance is improved by the transmission and coupling of the conductive member 4, and the insert loss is reduced.

In some embodiments, the conductive member 4 is a metal column with a radius of R. R is set based actual experience, for example, 0.1 mm. Different selections of R are in different application scenarios, which are not limited in the embodiments of the present disclosure. In addition, the conductive member 4 in the embodiments of the present disclosure is in other shapes, for example, in the cone, trapezoidal cylinder, prism, and other shape, which are not limited in the embodiments of the present disclosure.

Figure 5:
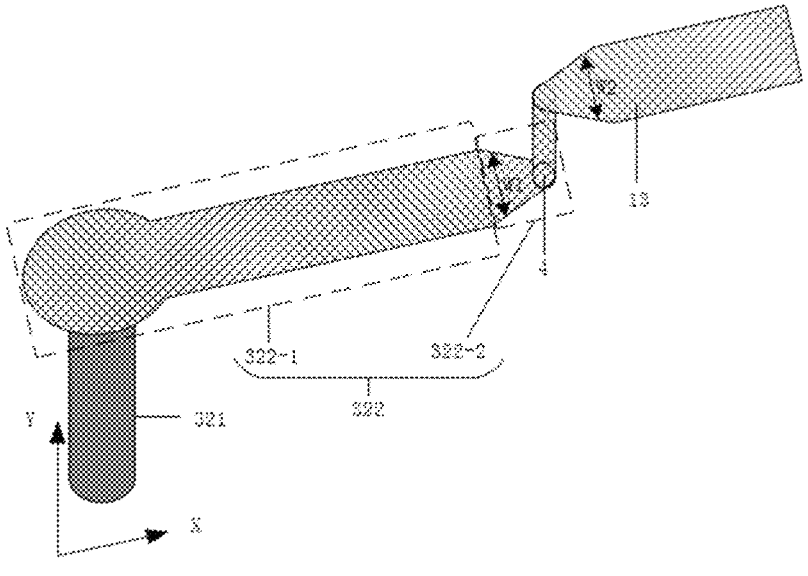
FIG. 5 is a stereoscopic diagram of a partial structure of an antenna according to some embodiments of the present disclosure.

In some embodiments, FIG. 5 is a stereoscopic diagram of a partial structure of an antenna according to some embodiments of the present disclosure. As shown in FIG. 5, in combination with any of the above embodiments, the branch circuit 322 includes a first body portion 322-1 and a first end portion 322-2 electrically connected to the conductive member 4, and the first electrode layer 13 includes a second body portion 13-1 and a second end portion 13-2 electrically connected to the conductive member 4. A width of a section of the first end portion 322-2 perpendicular to the first dielectric substrate 11 decreases monotonically in a direction from the first body portion 322-1 to the first end portion 322-2, and/or a width of a section of the second end portion 13-2 perpendicular to the first dielectric substrate 11 decreases monotonically in a direction from the second body portion 13-1 to the second end portion 13-2.

FIG. 5 is described by taking the width of the section of the first end portion 322-2 perpendicular to the first dielectric substrate 11 decreasing monotonically in the direction from the first body portion 322-1 to the first end portion 322-2, and the width of the section of the second end portion 13-2 perpendicular to the first dielectric substrate 11 decreasing monotonically in the direction from the second body portion 13-1 to the second end portion 13-2 as an example. As shown in FIG. 5, a forward direction of a first direction X indicates the direction from the first body portion 322-1 to the first end portion 322-2, and a reverse direction of the first direction X indicates the direction from the second body portion 13-1 to the second end portion 13-2. W1 indicates the width of the section of the first end portion 322-2 perpendicular to the first dielectric substrate 11, and W2 indicates the width of the section of the second end portion 13-2 perpendicular to the first dielectric substrate 11. W1 decreases monotonically in the forward direction of the first direction X, and W2 decreases monotonically in the reverse direction of the first direction X.

A connection position of the first electrode layer 13 and the conductive member 4 and a connection position of the feed structure 32 and the conductive member 4 are in a gradual size-changing mode, such that the energy input performance is improved, and the insert loss is reduced.

In conjunction with the above embodiments, as shown in FIG. 5, an orthogonal projection of the first end portion 322-2 on the first dielectric substrate 11 covers an orthogonal projection of the conductive member 4 on the first dielectric substrate 11, and an outline of the orthogonal projection of the conductive member 4 on the first dielectric substrate 11 falls within an outline of the orthogonal projection of the first end portion 322-2 on the first dielectric substrate 11; and/or an orthogonal projection of the second end portion 13-2 on the first dielectric substrate 11 covers an orthogonal projection of the conductive member 4 on the first dielectric substrate 11, and an outline of the orthogonal projection of the conductive member 4 on the first dielectric substrate 11 falls within an outline of the orthogonal projection of the second end portion 13-2 on the first dielectric substrate 11.

In the above embodiments, a connection position of the first electrode layer 13 and the conductive member 4 and a connection position of the feed structure 32 and the conductive member 4 are in a gradual size-changing mode, and thus the conductive member 4 is fitted with a resistance of the first electrode layer 13 and the feed structure 32 with different sizes.

It should be noted that the structure shown in FIG. 5 is combined with the structure shown in FIG. 3 and FIG. 4. In conjunction with the first example, and the structures shown in FIG. 5 and FIG. 3, the conductive member 4 is directly connected with the first electrode layer 13 by extending through the first via Via1, the second viaVia2, and the third via Via3. The conductive member 4 is a column with a radius of 0.1 mm. The connection position of the first electrode layer 13 and the conductive member 4 and the connection position of the feed structure 32 and the conductive member 4 are in the gradual size-changing mode. The orthogonal projection of the first end portion 322-2 on the first dielectric substrate 11 covers the orthogonal projection of the conductive member 4 on the first dielectric substrate 11, and the outline of the orthogonal projection of the conductive member 4 on the first dielectric substrate 11 falls within the outline of the orthogonal projection of the first end portion 322-2 on the first dielectric substrate 11; and the orthogonal projection of the second end portion 13-2 on the first dielectric substrate 11 covers the orthogonal projection of the conductive member 4 on the first dielectric substrate 11, and the outline of the orthogonal projection of the conductive member 4 on the first dielectric substrate 11 falls within the outline of the orthogonal projection of the second end portion 13-2 on the first dielectric substrate 11. In conjunction with the second example, and the structures shown in FIG. 5 and FIG. 4, the conductive member 4 is coupled to the first electrode layer 13 by extending through the first via Via1, the second viaVia2, and the third via Via3. The connection position of the first electrode layer 13 and the conductive member 4 and the connection position of the feed structure 32 and the conductive member 4 are in the gradual size-changing mode. The orthogonal projection of the first end portion 322-2 on the first dielectric substrate 11 covers the orthogonal projection of the conductive member 4 on the first dielectric substrate 11, and the outline of the orthogonal projection of the conductive member 4 on the first dielectric substrate 11 falls within the outline of the orthogonal projection of the first end portion 322-2 on the first dielectric substrate 11; and the orthogonal projection of the second end portion 13-2 on the first dielectric substrate 11 covers the orthogonal projection of the conductive member 4 on the first dielectric substrate 11, and the outline of the orthogonal projection of the conductive member 4 on the first dielectric substrate 11 falls within the outline of the orthogonal projection of the second end portion 13-2 on the first dielectric substrate 11.

Figure 6:
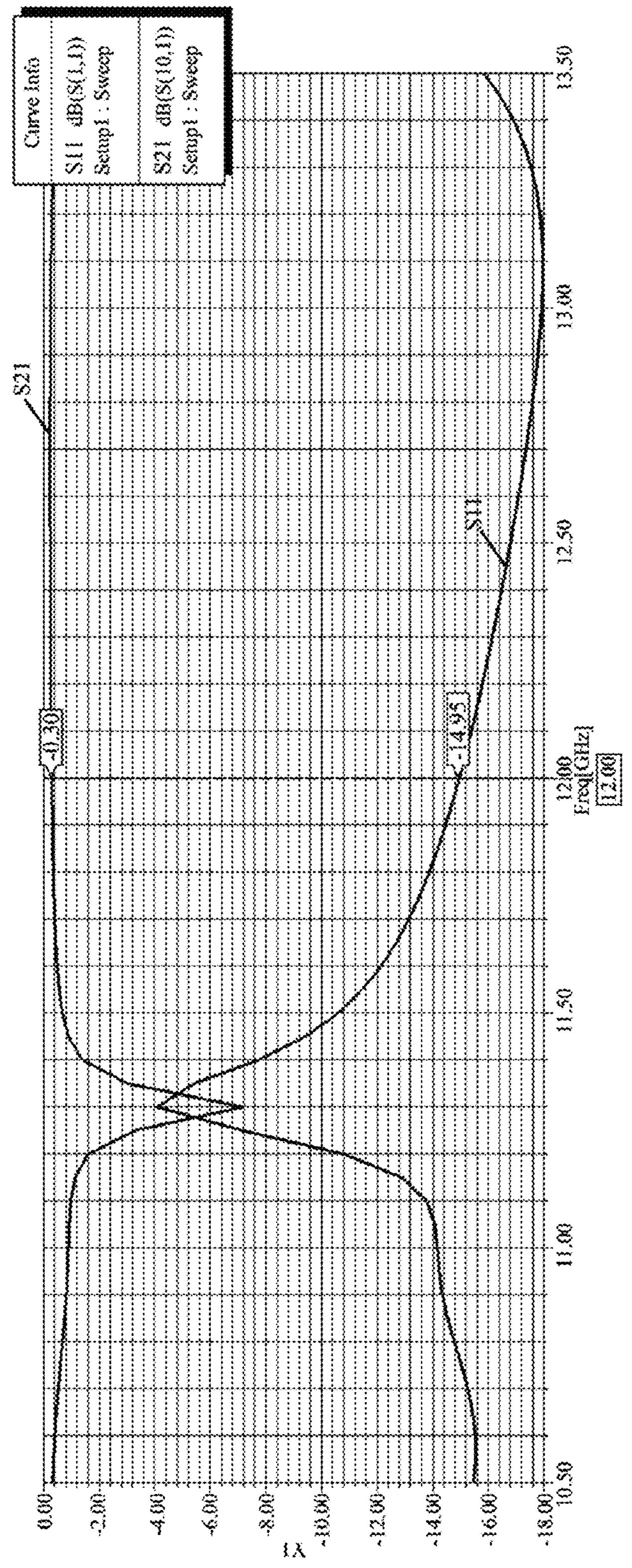
FIG. 6 is a simulation diagram of a parameter S in the structure corresponding to a first example.

FIG. 6 is a simulation diagram of a parameter S in the structure corresponding to a first example, that is, a simulation of the structure in FIG. 5 and the structure in FIG. 3. As shown in FIG. 6, the power divider for "dividing one into several" is equivalent to a metal line to illustrate by taking the simulation result of one branch circuit 322 and the corresponding phase-shifting structure 1 as an example for reducing the simulation complexity. It can be seen from the simulation result of FIG. 6 that in the gradual size-changing connection mode, at the resonance point 12 GHz, S11 is equal to −14.96 dB, and S21 is equal to −0.3 dB. Compared with some practices (at the resonance point 12 GHz, S11 is equal to −9.81 dB, and S21 is equal to −1.03 dB), at the same conditions, the energy input performance (S11) is improved in the embodiments of the present disclosure, and the insert loss (S21) is reduced.

Figure 7:
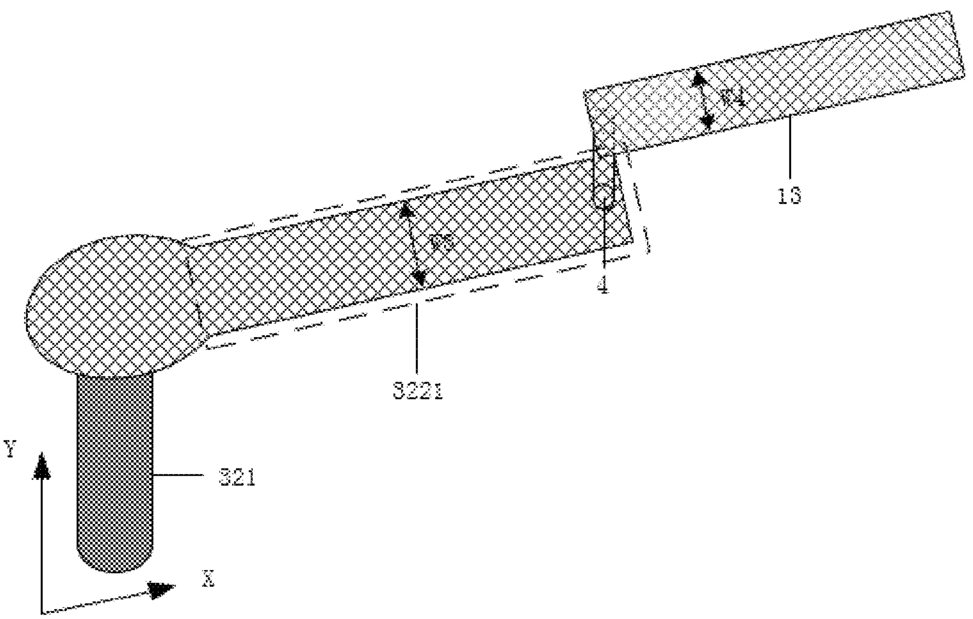
FIG. 7 is a stereoscopic diagram of a partial structure of an antenna according to some embodiments of the present disclosure.

In some embodiments, FIG. 7 is a stereoscopic diagram of a partial structure of an antenna according to some embodiments of the present disclosure. As shown in FIG. 7, in conjunction with any of the above embodiments, an orthogonal projection of the branch circuit 322 on the first dielectric substrate 11 covers an orthogonal projection of the conductive member 4 on the first dielectric substrate 11, and an orthogonal projection of the first electrode layer 13 on the first dielectric substrate 11 covers the orthogonal projection of the conductive member 4 on the first dielectric substrate 11; and for a remaining portion 3221, other than a portion connected to the main circuit 321, of the branch circuit 322, a width of a section of the remaining portion 3221 perpendicular to the first dielectric substrate 11 is uniform, and/or, a width of a section of the first electrode layer 13 perpendicular to the first dielectric substrate 11 is uniform.

FIG. 7 is described by taking the widths of the section of the remaining portion 3221 perpendicular to the first dielectric substrate 11 being uniform, and the width of the section of the first electrode layer 13 perpendicular to the first dielectric substrate 11 being uniform as an example. As shown in FIG. 7, W3 represents the width of the section of the remaining portion 3221 perpendicular to the first dielectric substrate 11, and W4 represents the width of the section of the first electrode layer 13 perpendicular to the first dielectric substrate 11.

It should be noted that the structure shown in FIG. 7 is combined with the structure in FIG. 3 or FIG. 4. In conjunction with the third example, and the structures shown in FIG. 7 and FIG. 3, the conductive member 4 is directly connected with the first electrode layer 13 by extending through the first via Via1, the second viaVia2, and the third via Via3. The conductive member 4 is a column with a radius of 0.1 mm. The orthogonal projection of the branch circuit 322 on the first dielectric substrate 11 covers the orthogonal projection of the conductive member 4 on the first dielectric substrate 11, and the orthogonal projection of the first electrode layer 13 on the first dielectric substrate 11 covers the orthogonal projection of the conductive member 4 on the first dielectric substrate 11; and for the remaining portion, other than the portion connected to the main circuit 321, of the branch circuit 322, the width of the section of the remaining portion perpendicular to the first dielectric substrate 11 is uniform, and the width of the section of the first electrode layer 13 perpendicular to the first dielectric substrate 11 is uniform. In conjunction with the fourth example, and the structures shown in FIG. 7 and FIG. 4, the conductive member 4 is coupled to the first electrode layer 13 by extending through the first via Via1, the second viaVia2, and the third via Via3. A distance between a surface, proximal to the first electrode layer 13, of the conductive member 4 and a surface, proximal to the conductive member 4, of the first electrode layer 13 is 2 μm. The orthogonal projection of the branch circuit 322 on the first dielectric substrate 11 covers the orthogonal projection of the conductive member 4 on the first dielectric substrate 11, and the orthogonal projection of the first electrode layer 13 on the first dielectric substrate 11 covers the orthogonal projection of the conductive member 4 on the first dielectric substrate 11; and for the remaining portion, other than the portion connected to the main circuit 321, of the branch circuit 322, the width of the section of the remaining portion perpendicular to the first dielectric substrate 11 is uniform, and the width of the section of the first electrode layer 13 perpendicular to the first dielectric substrate 11 is uniform.

Figure 8:
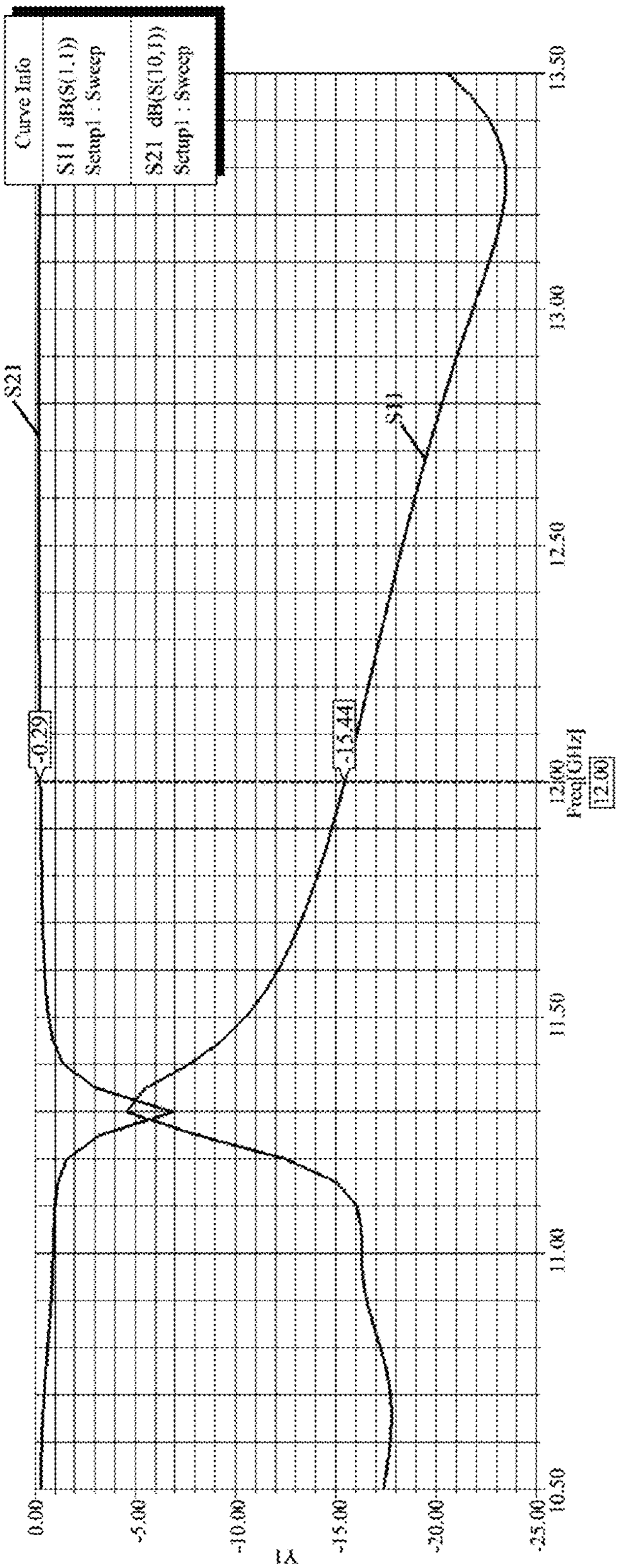
FIG. 8 is a simulation diagram of a parameter S in the structure corresponding to a third example.

FIG. 8 is a simulation diagram of a parameter S in the structure corresponding to a third example, that is, a simulation of the structure in FIG. 7 and the structure in FIG. 3. As shown in FIG. 8, the power divider for "dividing one into several" is equivalent to a metal line to illustrate by taking the simulation result of one branch circuit 322 and the corresponding phase-shifting structure 1 as an example for reducing the simulation complexity. It can be seen from the simulation result of FIG. 8 that in the size-unchanged connection mode, at the resonance point 12 GHz, S11 is equal to −15.44 dB, and S21 is equal to −0.29 dB. Compared with some practices (at the resonance point 12 GHz, S11 is equal to −9.81 dB, and S21 is equal to −1.03 dB), at the same conditions, the energy input performance (S11) is greater in the embodiments of the present disclosure, and the insert loss (S21) is less.

Figure 9:
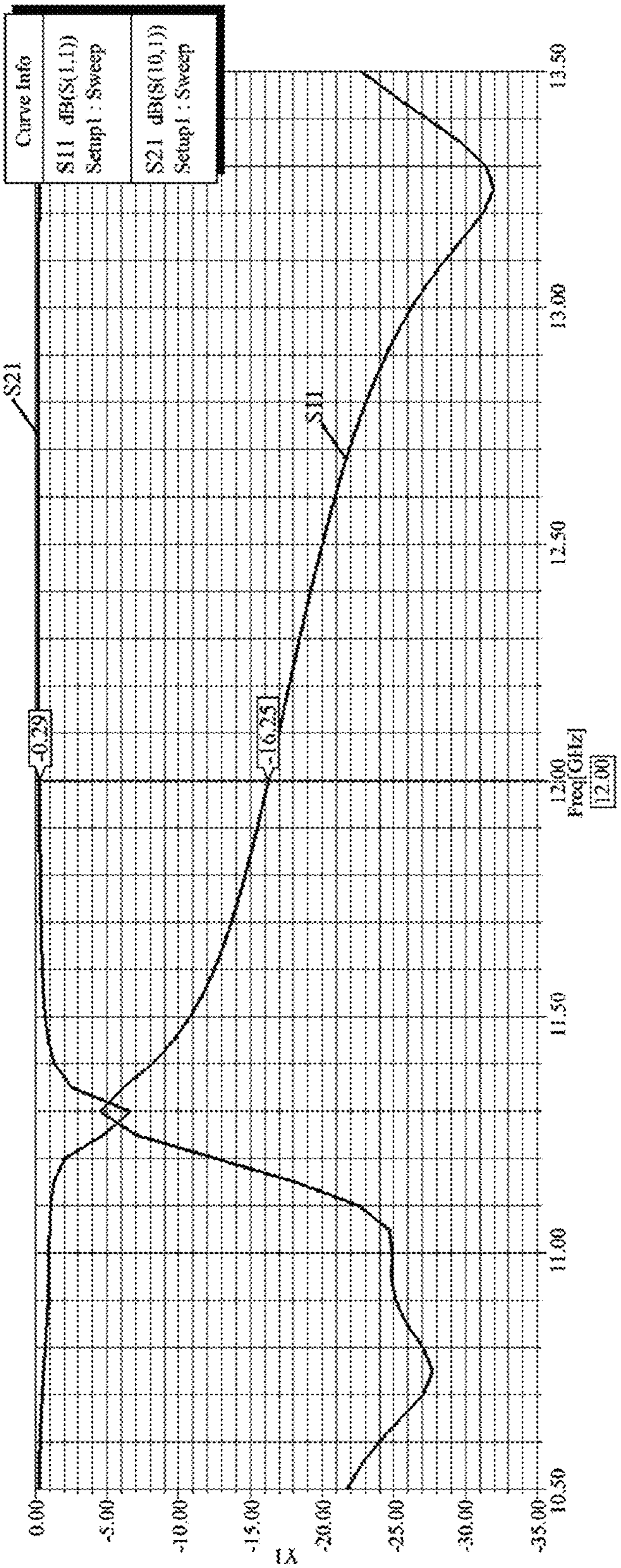
FIG. 9 is a simulation diagram of a parameter S in the structure corresponding to a fourth example.

FIG. 9 is a simulation diagram of a parameter S in the structure corresponding to a fourth example, that is, a simulation of the structure in FIG. 7 and the structure in FIG. 4. As shown in FIG. 8, the power divider for "dividing one into several" is equivalent to a metal line to illustrate by taking the simulation result of one branch circuit 322 and the corresponding phase-shifting structure 1 as an example for reducing the simulation complexity. It can be seen from the simulation result of FIG. 9 that in the size-unchanged connection mode, at the resonance point 12 GHz, S11 is equal to −16.25 dB, and S21 is equal to −0.29 dB. Compared with some practices (at the resonance point 12 GHz, S11 is equal to −9.81 dB, and S21 is equal to −1.03 dB), at the same conditions, the energy input performance (S11) is improved in the embodiments of the present disclosure, and the insert loss (S21) is reduced. Furthermore, compared with the structure corresponding to the first example, the energy input performance (S11) is greater in the embodiments of the present disclosure, and the insert loss (S21) is less. Compared with the structure corresponding to the third example, the energy input performance (S11) is greater in the embodiments of the present disclosure.

Figure 10A:
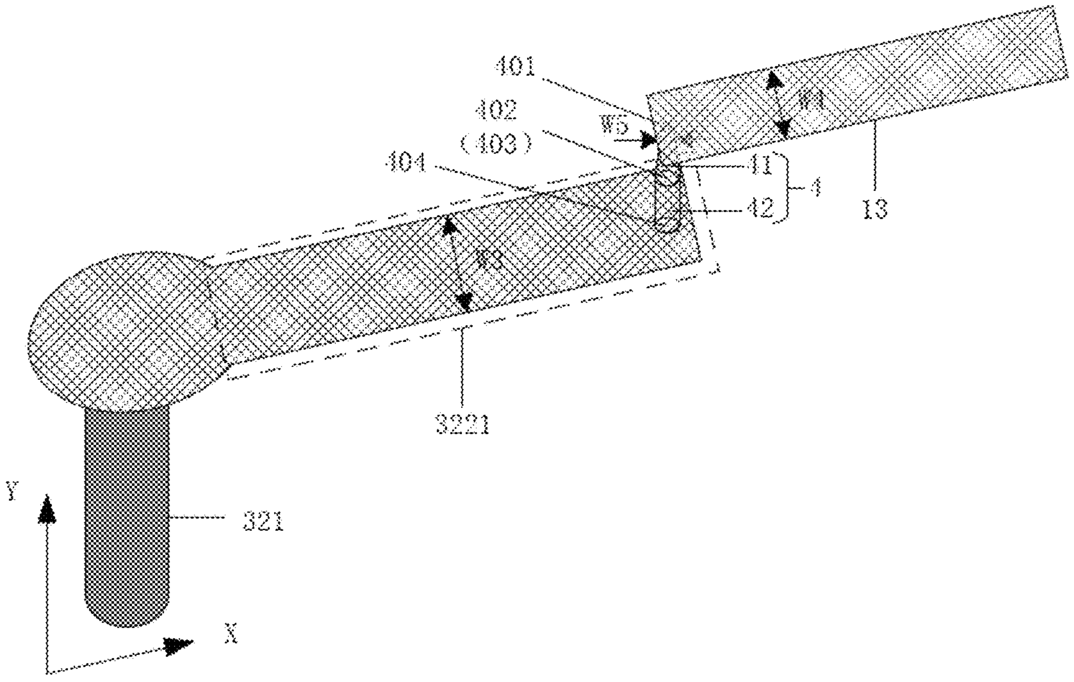
FIG. 10*a* is a stereoscopic diagram of a partial structure of an antenna according to some embodiments of the present disclosure.

In some embodiments, FIG. 10*a* is a stereoscopic diagram of a partial structure of an antenna according to some embodiments of the present disclosure. As shown in FIG. 10*a*, the conductive member 4 includes a first conductive portion 41 and a second conductive portion 42 that are electrically connected. The first conductive portion 41 is disposed in the third via Via3 of the first dielectric substrate 11, the second conductive portion 42 is disposed in the first via Via1 and the second via Via2, and a width of a section of the first conductive portion 41 perpendicular to the first dielectric substrate 11 increases monotonically in a direction from the second dielectric substrate 12 to the first dielectric substrate 11.

As shown in FIG. 10*a*, a reverse direction of a second direction Y indicates the direction from the second dielectric substrate 12 to the first dielectric substrate 11, W5 indicates the width of the section of the first conductive portion 41 perpendicular to the first dielectric substrate 11, and W5 increases monotonically in the reverse direction of the second direction Y. Illustratively, the conductive member 4 is a trapezoidal column, an outline of the section of the first conductive portion 41 perpendicular to the first dielectric substrate 11 is in a trapezoidal shape, and in the two relatively parallel edges, the shorter edge is closer to the first dielectric substrate 11 than the longer edge. That is, a width of the trapezoid decreases monotonically in the reverse direction of the second direction Y.

Illustratively, the first conductive portion 41 and the second conductive portion 42 are manufactured independently. The first conductive portion 41 and the second conductive portion 42 are disposed independently, and the conductive member 4 is formed by connecting the pad in the patch process. A section of the first conductive portion 41 and a section of the second conductive portion 42 are in circular shapes, and centers of the circles are respectively coaxial.

Figure 12A:
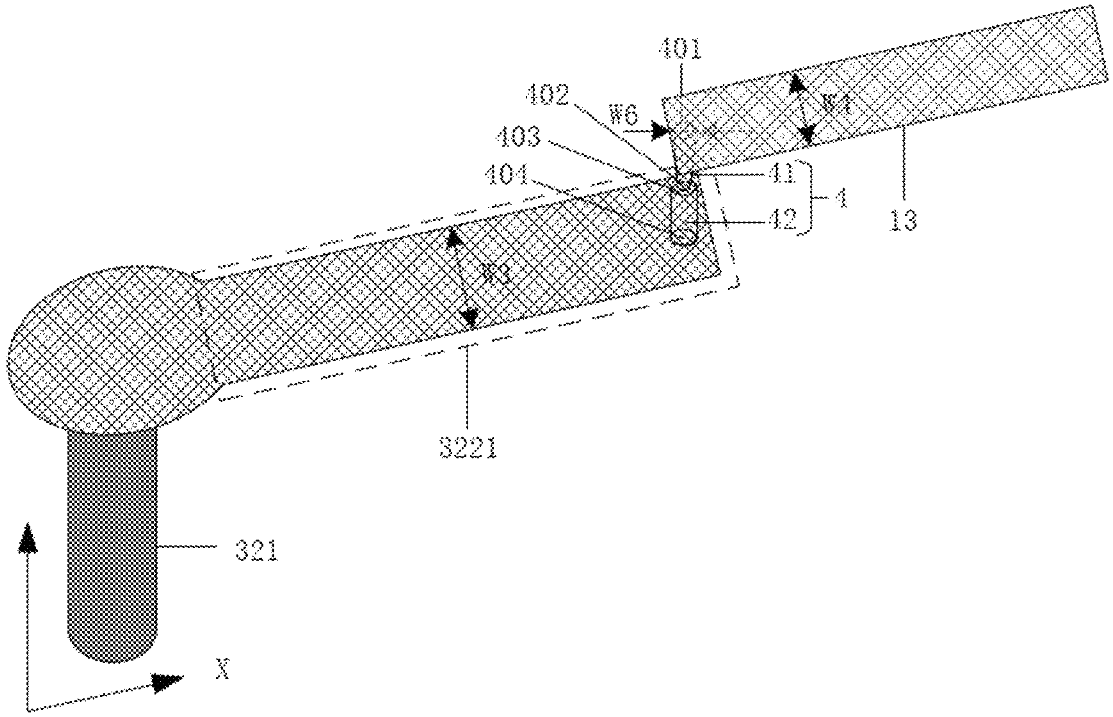
FIG. 12*a* is a stereoscopic diagram of a partial structure of an antenna according to some embodiments of the present disclosure.

In conjunction with the above embodiments, as shown in FIG. 12*a*, the first conductive portion 41 includes a first surface 401 and a second surface 402 that are opposite to each other in a thickness direction of the first conductive portion 41. The first surface 401 is closer to the first dielectric substrate 11 than the second surface 402, an orthogonal projection of the second surface 402 on the first dielectric substrate 11 covers an orthogonal projection of the first surface 401 on the first dielectric substrate 11, and a proportion of an area of the first surface 401 and an area of the second surface 402 ranges from 0.125 to 0.375.

Illustratively, shapes of outlines of the orthogonal projections of the first surface 401 and the second surface 402 are the same, an area of the orthogonal projection of the second surface 402 is greater than an area of the orthogonal projection of the first surface 401, and the orthogonal projection of the first surface 401 on the first dielectric substrate 11 falls within the orthogonal projection of the second surface 402 on the first dielectric substrate 11. Illustratively, the first surface 401 is a circular surface with a radius of 0.05 mm, the second surface 402 is a circular surface with a radius of 0.1 mm, and a ratio of the area of the first surface 401 to the area of the second surface 402 is 0.25.

In conjunction with the above embodiments, as shown in FIG. 10*a*, the second conductive portion 42 includes a third surface 403 and a fourth surface 404 that are opposite to each other in a thickness direction of the second conductive portion 42. The third surface 403 is closer to the first conductive portion 41 than the fourth surface 404, the third surface 403 is connected to the second surface 402, and an orthogonal projection of the third surface 403 is coincident with the orthogonal projection of the second surface 402. The "orthogonal projection being coincident" here indicates that the orthogonal projection of the third surface 403 is completely coincident with the orthogonal projection of the second surface 402. Illustratively, the second surface 402 is a circular surface with the radius of 0.1 mm, and the third surface 403 is also a circular surface with the radius of 0.1 mm.

Figure 10B:
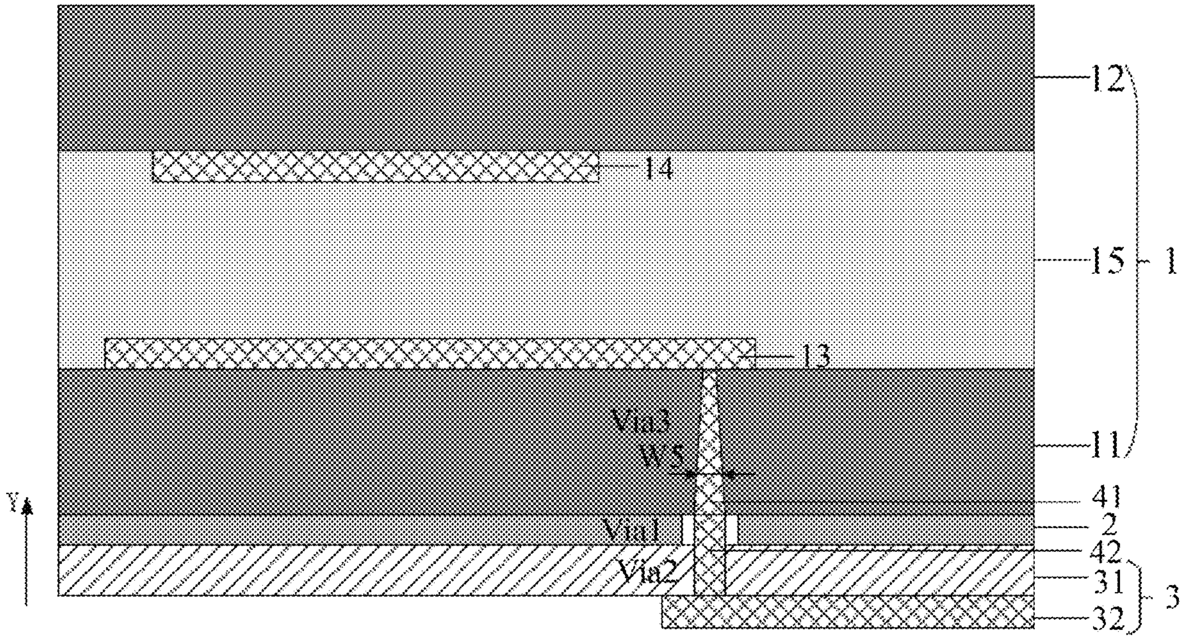
FIG. 10*b* is a schematic diagram of film layers of the antenna with the structure shown in FIG. 10*a;*

It should be noted that the conductive member 4 shown in FIG. 10*a* is connected by the connection mode shown in FIG. 3 or FIG. 4, and is combined with the structure of the feed structure 32 and the first electrode layer 13 shown in FIG. 5 or FIG. 7. The fifth example and FIG. 10*b* are schematic diagrams of film layers of the antenna shown in FIG. 10*a*. As shown in FIG. 10*b*, in the conductive member 4 shown in FIG. 10*a*, the conductive member 4 is directly connected, and is combined with the structure of the feed structure 32 and the first electrode layer 13 shown in FIG. 7. By taking the conductive member 4 in the sixth example and FIG. 10*a* as an example, the conductive member 4 is coupled, and is combined with the structure of the feed structure 32 and the first electrode layer 13 shown in FIG. 7. By taking the conductive member 4 in the seventh example and FIG. 10*a* as an example, the conductive member 4 is directly connected, and is combined with the structure of the feed structure 32 and the first electrode layer 13 shown in FIG. 5. By taking the conductive member 4 in the eighth example and FIG. 10*a* as an example, the conductive member 4 is coupled, and is combined with the structure of the feed structure 32 and the first electrode layer 13 shown in FIG. 5.

Figure 11:
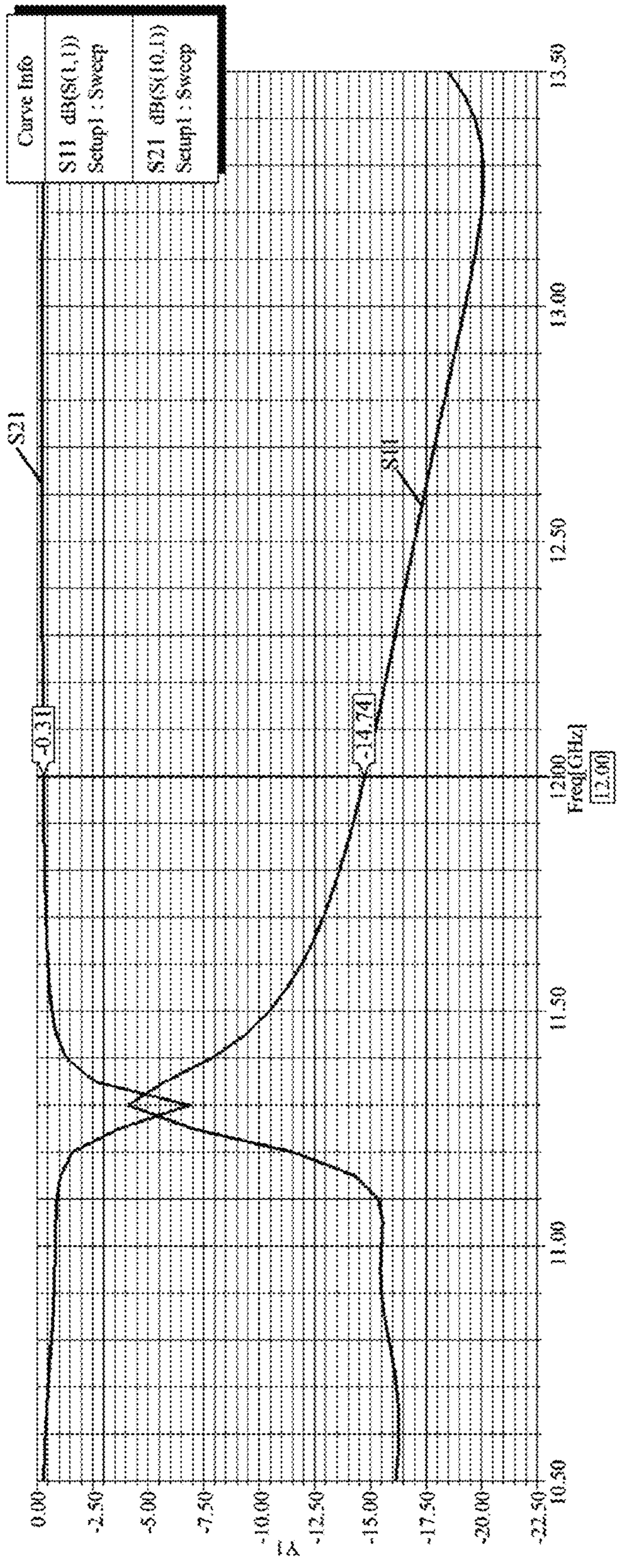
FIG. 11 is a simulation diagram of a parameter S in the structure corresponding to a fifth example.

FIG. 11 is a simulation diagram of a parameter S in the structure corresponding to a fifth example. As shown in FIG. 11, the power divider for "dividing one into several" is equivalent to a metal line to illustrate by taking the simulation result of one branch circuit 322 and the corresponding phase-shifting structure 1 as an example for reducing the simulation complexity. It can be seen from the simulation result of FIG. 11 that at the resonance point 12 GHz, S11 is equal to −14.74 dB, and S21 is equal to −0.31 dB. Compared with some practices (at the resonance point 12 GHz, S11 is equal to −9.81 dB, and S21 is equal to −1.03 dB), at the same conditions, the energy input performance (S11) is improved in the embodiments of the present disclosure, and the insert loss (S21) is reduced.

In some embodiments, FIG. 12*a* is a stereoscopic diagram of a partial structure of an antenna according to some embodiments of the present disclosure. As shown in FIG. 12*a*, the conductive member 4 includes a first conductive portion 41 and a second conductive portion 42 that are electrically connected. The first conductive portion 41 is disposed in the third via Via3 of the first dielectric substrate 11, the second conductive portion 42 is disposed in the first via Via1 and the second via Via2, and a width of a section of the first conductive portion 41 perpendicular to the first dielectric substrate 11 decreases monotonically in a direction from the second dielectric substrate 12 to the first dielectric substrate 11.

As shown in FIG. 12*a*, a reverse direction of the second direction Y represents the direction from the second dielectric substrate 12 to the first dielectric substrate 11, W6 indicates the width of the section of the first conductive portion 41 perpendicular to the first dielectric substrate 11, and W6 decreases monotonically in the reverse direction of the second direction Y. Illustratively, the conductive member 4 is a trapezoidal column, an outline of the section of the first conductive portion 41 perpendicular to the first dielectric substrate 11 is in a trapezoidal shape, and in the two relatively parallel edges, the longer edge is closer to the first dielectric substrate 11 than the shorter edge. That is, a width of the trapezoid decreases monotonically in the reverse direction of the second direction Y.

Illustratively, the first conductive portion 41 and the second conductive portion 42 are manufactured independently. The first conductive portion 41 and the second conductive portion 42 are disposed independently, and the conductive member 4 is formed by connecting the pad in the patch process. A section of the first conductive portion 41 and a section of the second conductive portion 42 are in circular shapes, and centers of the circles are respectively coaxial.

In conjunction with the above embodiments, as shown in FIG. 12*a*, the first conductive portion 41 includes a first surface 401 and a second surface 402 that are opposite to each other in a thickness direction of the first conductive portion 41. The first surface 401 is closer to the first dielectric substrate 11 than the second surface 402, an orthogonal projection of the first surface 401 on the first dielectric substrate 11 covers an orthogonal projection of the second surface 402 on the first dielectric substrate 11, and a proportion of an area of the second surface 402 and an area of the first surface 401 ranges from 0.125 to 0.375.

Illustratively, shapes of outlines of the orthogonal projections of the first surface 401 and the second surface 402 are the same, an area of the orthogonal projection of the second surface 402 is less than an area of the orthogonal projection of the first surface 401, and the orthogonal projection of the second surface 402 on the first dielectric substrate 11 falls within the orthogonal projection of the first surface 401 on the first dielectric substrate 11. Illustratively, the second surface 402 is a circular surface with a radius of 0.05 mm, the first surface 401 is a circular surface with a radius of 0.1 mm, and a ratio of the area of the second surface 402 to the area of the first surface 401 is 0.25.

In conjunction with the above embodiments, as shown in FIG. 12*a*, the second conductive portion 42 includes a third surface 403 and a fourth surface 404 that are opposite to each other in a thickness direction of the second conductive portion 42. The third surface 403 is closer to the first conductive portion 41 than the fourth surface 404, the third surface 403 is connected to the second surface 402, and an orthogonal projection of the third surface 403 is coincident with the orthogonal projection of the second surface 402.

Illustratively, shapes of outlines of the orthogonal projections of the third surface 403 and the second surface 402 are the same, an area of the orthogonal projection of the second surface 402 is less than an area of the orthogonal projection of the third surface 403, and the orthogonal projection of the second surface 402 on the first dielectric substrate 11 falls within the orthogonal projection of the third surface 403 on the first dielectric substrate 11. Illustratively, the second surface 402 is a circular surface with a radius of 0.05 mm, the third surface 403 is a circular surface with a radius of 0.1 mm, and a ratio of the area of the second surface 402 to the area of the third surface 403 is 0.25.

Figure 12B:
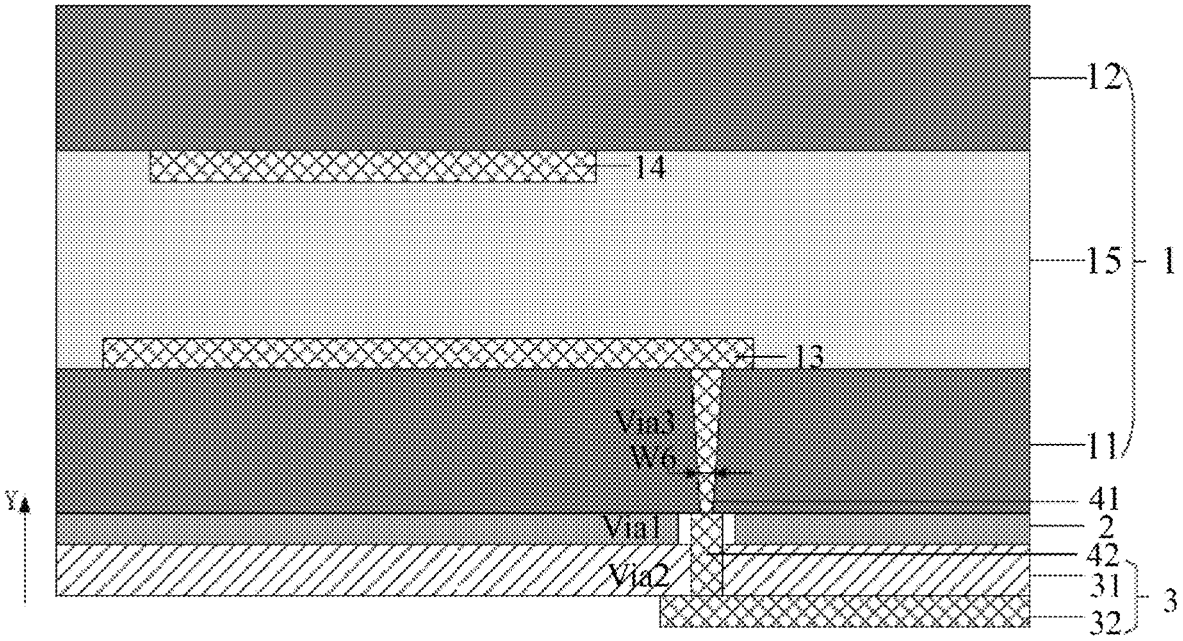
FIG. 12*b* is a schematic diagram of film layers of an antenna with the structure shown in FIG. 12*a;*

It should be noted that the conductive member 4 shown in FIG. 12*a* is connected by the connection mode shown in FIG. 3 or FIG. 4, and is combined with the structure of the feed structure 32 and the first electrode layer 13 shown in FIG. 5 or FIG. 7. The ninth example and FIG. 12*b* are schematic diagrams of film layers of the antenna shown in FIG. 12*a*. As shown in FIG. 12*b*, in the conductive member 4 shown in FIG. 12*a*, the conductive member 4 is directly connected, and is combined with the structure of the feed structure 32 and the first electrode layer 13 shown in FIG. 7. By taking the conductive member 4 in the tenth example and FIG. 12*a* as an example, the conductive member 4 is coupled, and is combined with the structure of the feed structure 32 and the first electrode layer 13 shown in FIG. 7. By taking the conductive member 4 in the eleventh example and FIG. 12*a* as an example, the conductive member 4 is directly connected, and is combined with the structure of the feed structure 32 and the first electrode layer 13 shown in FIG. 5. By taking the conductive member 4 in the twelfth example and FIG. 12*a* as an example, the conductive member 4 is coupled, and is combined with the structure of the feed structure 32 and the first electrode layer 13 shown in FIG. 5.

Figure 13:
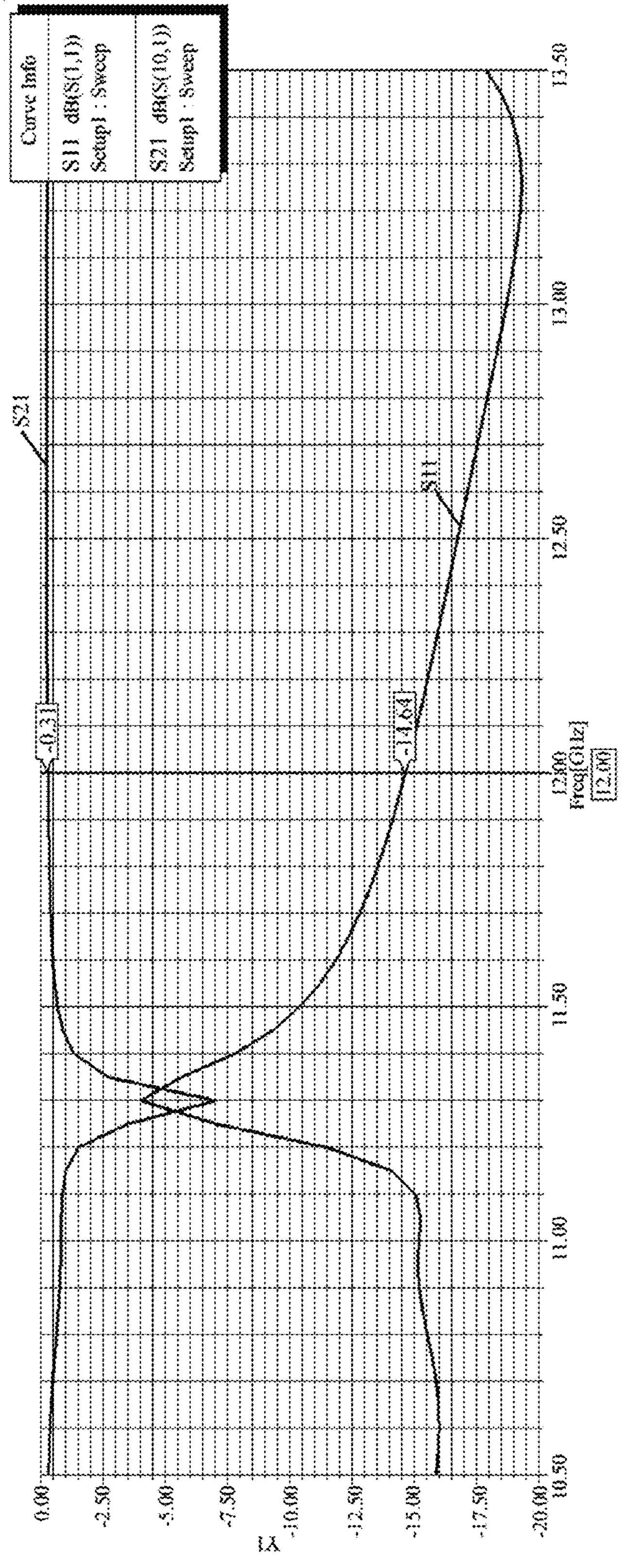
FIG. 13 is a simulation diagram of a parameter S in the structure corresponding to a ninth example.

FIG. 13 is a simulation diagram of a parameter S in the structure corresponding to a ninth example. As shown in FIG. 13, the power divider for "dividing one into several" is equivalent to a metal line to illustrate by taking the simulation result of one branch circuit 322 and the corresponding phase-shifting structure 1 as an example for reducing the simulation complexity. It can be seen from the simulation result of FIG. 13 that at the resonance point 12 GHz, S11 is equal to −14.64 dB, and S21 is equal to −0.31 dB. Compared with some practices (at the resonance point 12 GHz, S11 is equal to −9.81 dB, and S21 is equal to −1.03 dB), at the same conditions, the energy input performance (S11) is improved in the embodiments of the present disclosure, and the insert loss (S21) is reduced. Furthermore, compared with the structure shown in the first example, the energy input performance (S11) is greater in the embodiments of the present disclosure.

Figure 14A:
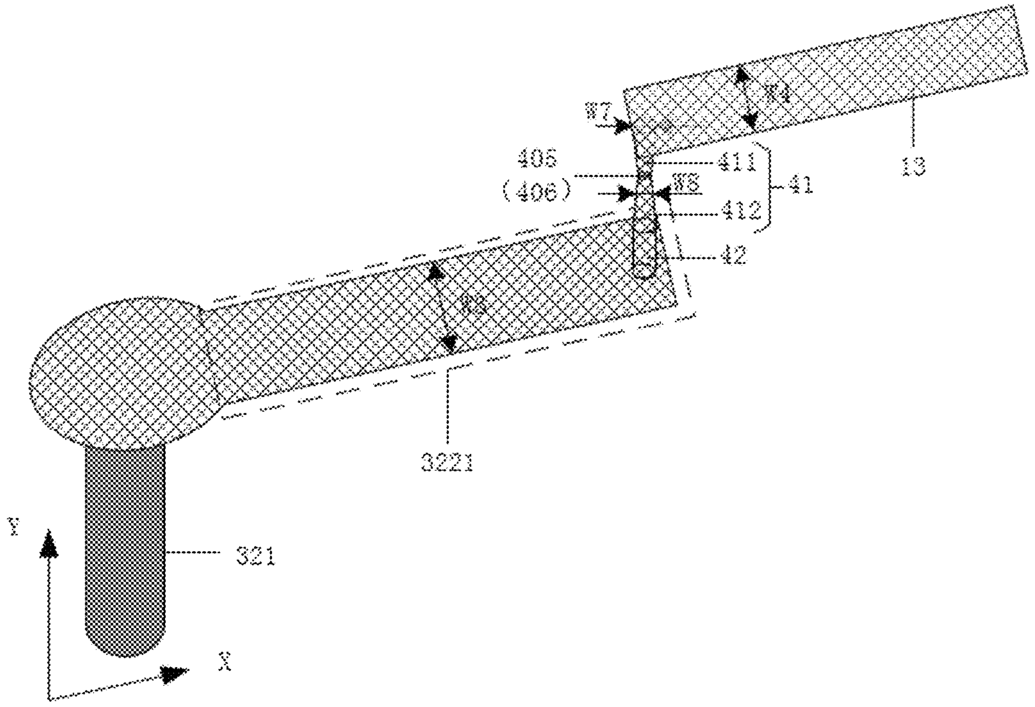
FIG. 14*a* is a stereoscopic diagram of a partial structure of an antenna according to some embodiments of the present disclosure.

In some embodiments, FIG. 14*a* is a stereoscopic diagram of a partial structure of an antenna according to some embodiments of the present disclosure. As shown in FIG. 14*a*, the conductive member 4 includes a first conductive portion 41 and a second conductive portion 42 that are electrically connected. The first conductive portion 41 is disposed in the third via Via3 of the first dielectric substrate 11, and the second conductive portion 42 is disposed in the first via Via1 and the second via Via2. The first conductive portion 41 includes a first conductive sub-portion 411 and a second conductive sub-portion 412, and the first conductive portion 41 is closer to the first electrode layer 13 than the second conductive portion 412*s*. A width of a section of the first conductive sub-portion 411 perpendicular to the first dielectric substrate 11 decreases monotonically in a direction from the second dielectric substrate 12 to the first dielectric substrate 11, and/or a width of a section of the second conductive sub-portion 412 perpendicular to the first dielectric substrate 11 increases monotonically in a direction from the second dielectric substrate 12 to the first dielectric substrate 11.

FIG. 14*a* is described by taking the width of the section of the first conductive sub-portion 411 perpendicular to the first dielectric substrate 11 decreasing monotonically in the direction from the second dielectric substrate 12 to the first dielectric substrate 11, and the width of the section of the second conductive sub-portion 412 perpendicular to the first dielectric substrate 11 increasing monotonically in the direction from the second dielectric substrate 12 to the first dielectric substrate 11 as an example. As shown in FIG. 14*a*, a reverse direction of the second direction Y represents the direction from the second dielectric substrate 12 to the first dielectric substrate 11, W7 indicates the width of the section of the first conductive sub-portion 411 perpendicular to the first dielectric substrate 11, and W7 decreases monotonically in the reverse direction of the second direction Y. W8 indicates the width of the section of the second conductive sub-portion 412 perpendicular to the first dielectric substrate 11, and W8 increases monotonically in the reverse direction of the second direction Y.

Illustratively, the first conductive sub-portion 411 and the second conductive sub-portion 412 are integrated. A section of the first conductive sub-portion 411 and a section of the second conductive sub-portion 412 are in circular shapes, and centers of the circles are respectively coaxial.

In conjunction with the above embodiments, as shown in FIG. 14*a*, the first conductive sub-portion 411 includes a first surface 401 and a fifth surface 405 that are opposite to each other in a thickness direction of the first conductive sub-portion 411. The first surface 401 is closer to the first dielectric substrate 11 than the fifth surface 405. The second conductive sub-portion 412 includes a sixth surface 406 and a second surface 402 that are opposite to each other in a thickness direction of the second conductive sub-portion 412. The sixth surface 406 is closer to the first dielectric substrate 11 than the second surface 402. An orthogonal projection of the first surface 401 on the first dielectric substrate 11 covers an orthogonal projection of the fifth surface 405 on the first dielectric substrate 11, and a proportion of an area of the fifth surface 405 and an area of the first surface 401 ranges from 0.125 to 0.375; and/or an orthogonal projection of the second surface 402 on the first dielectric substrate 11 covers an orthogonal projection of the sixth surface 406 on the first dielectric substrate 11, and a proportion of an area of the sixth surface 406 and an area of the second surface 402 ranges from 0.125 to 0.375.

Illustratively, shapes of outlines of the orthogonal projections of the first surface 401, the second surface 402, the fifth surface 405, and the sixth surface 406 are the same. An area of the orthogonal projection of the first surface 401 is equal to an area of the orthogonal projection of the second surface 402, and an area of the orthogonal projection of the fifth surface 405 is equal to an area of the orthogonal projection of the sixth surface 406. The area of the orthogonal projection of the first surface 401 is greater than the area of the orthogonal projection of the fifth surface 405 (that is, the area of the orthogonal projection of the second surface 402 is greater than the area of the orthogonal projection of the sixth surface 406), the orthogonal projection of the fifth surface 405 on the first dielectric substrate 11 falls within the orthogonal projection of the first surface 401 on the first dielectric substrate 11, and the orthogonal projection of the sixth surface 406 on the first dielectric substrate 11 falls within the orthogonal projection of the second surface 402 on the first dielectric substrate 11. Illustratively, the first surface 401 and the second surface 402 are circular surfaces with the radius of 0.1 mm, the fifth surface 405 and the sixth surface 406 are circular surfaces with a radius of 0.25 mm, and a ratio of the area of the fifth surface 405 to the area of the first surface 401 is 0.25 (that is, a ratio of the area of the sixth surface 406 to the area of the second surface 402 is 0.25).

In conjunction with the above embodiments, as shown in FIG. 14*a*, the second conductive portion 42 includes a third surface 403 and a fourth surface 404 that are opposite to each other in a thickness direction of the second conductive portion 42. The third surface 403 is closer to the first conductive portion 41 than the fourth surface 404, the third surface 403 is connected to the second surface 402, and an orthogonal projection of the third surface 403 is coincident with the orthogonal projection of the second surface 402. The "orthogonal projection being coincident" here indicates that the orthogonal projection of the third surface 403 is completely coincident with the orthogonal projection of the second surface 402. Illustratively, the second surface 402 is a circular surface with the radius of 0.1 mm, and the third surface 403 is also a circular surface with the radius of 0.1 mm. Illustratively, the first conductive portion 41 and the second conductive portion 42 are manufactured independently. The first conductive portion 41 and the second conductive portion 42 are disposed independently, and the conductive member 4 is formed by connecting the pad in the patch process. A section of the first conductive portion 41 and a section of the second conductive portion 42 are in circular shapes, and centers of the circles are respectively coaxial.

Figure 14B:
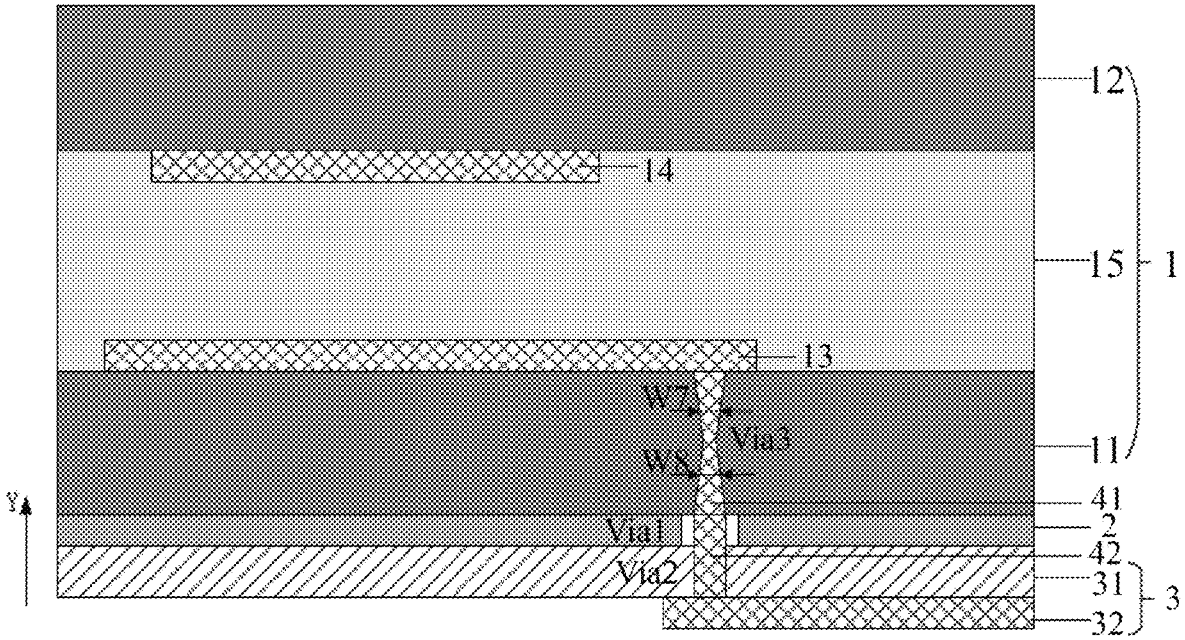
FIG. 14*b* is a schematic diagram of film layers of an antenna with the structure shown in FIG. 14*a;*

It should be noted that the conductive member 4 shown in FIG. 14*a* is connected by the connection mode shown in FIG. 3 or FIG. 4, and is combined with the structure of the feed structure 32 and the first electrode layer 13 shown in FIG. 5 or FIG. 7. The thirteenth example and FIG. 14*b* are schematic diagrams of film layers of the antenna shown in FIG. 14*a*. As shown in FIG. 14*b*, in the conductive member 4 shown in FIG. 14*a*, the conductive member 4 is directly connected, and is combined with the structure of the feed structure 32 and the first electrode layer 13 shown in FIG. 7. By taking the conductive member 4 in the fourteenth example and FIG. 14*a* as an example, the conductive member 4 is coupled, and is combined with the structure of the feed structure 32 and the first electrode layer 13 shown in FIG. 7. By taking the conductive member 4 in the fifteenth example and FIG. 14*a* as an example, the conductive member 4 is directly connected, and is combined with the structure of the feed structure 32 and the first electrode layer 13 shown in FIG. 5. By taking the conductive member 4 in the sixteenth example and FIG. 14*a* as an example, the conductive member 4 is coupled, and is combined with the structure of the feed structure 32 and the first electrode layer 13 shown in FIG. 5.

Figure 15:
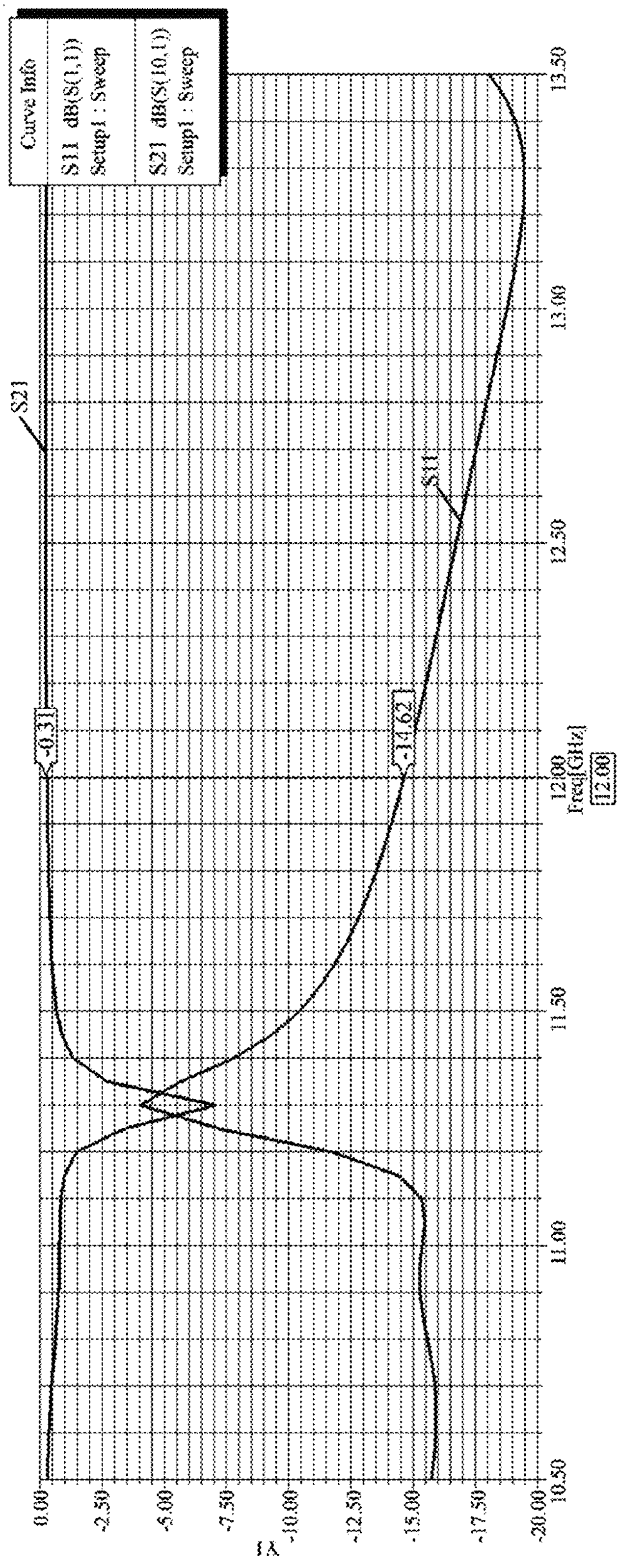
FIG. 15 is a simulation diagram of a parameter S in the structure corresponding to a thirteenth example.

FIG. 15 is a simulation diagram of a parameter S in the structure corresponding to a thirteenth example. As shown in FIG. 15, the power divider for "dividing one into several" is equivalent to a metal line to illustrate by taking the simulation result of one branch circuit 322 and the corresponding phase-shifting structure 1 as an example for reducing the simulation complexity. It can be seen from the simulation result of FIG. 15 that at the resonance point 12 GHz, S11 is equal to −14.62 dB, and S21 is equal to −0.31 dB. Compared with some practices (at the resonance point 12 GHz, S11 is equal to −9.81 dB, and S21 is equal to −1.03 dB), at the same conditions, the energy input performance (S11) is improved in the embodiments of the present disclosure, and the insert loss (S21) is reduced.

Figure 16:
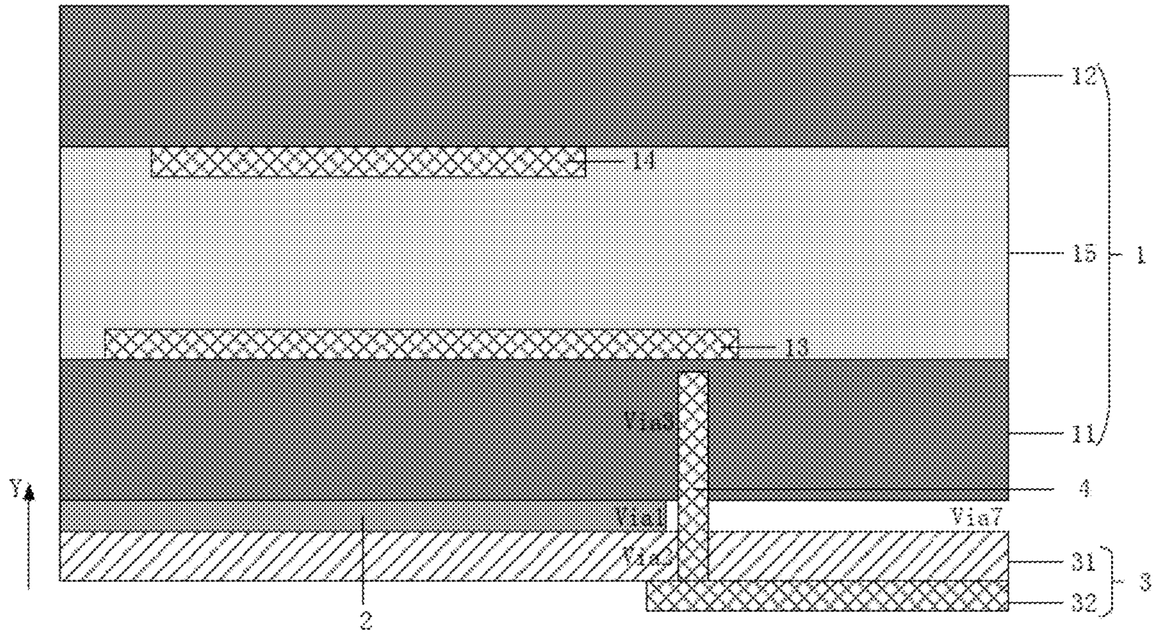
FIG. 16 is a schematic diagram of film layers of an antenna according to some embodiments of the present disclosure.

In some embodiments, FIG. 16 is a schematic diagram of film layers of an antenna according to some embodiments of the present disclosure. As shown in FIG. 16, the feed substrate 3 further includes a second dielectric layer 33 on a side, facing away from the first dielectric layer 31, of the feed structure 32 and a second reference electrode layer 34 on a side, facing away from the feed structure 32, of the second dielectric layer 33. An orthogonal projection of the first reference electrode layer 2 on the first dielectric substrate 11 is not overlapped with an orthogonal projection of the feed structure 32 on the first dielectric substrate 11.

In some practices, as shown in FIG. 1*b*, the first reference electrode layer 2 is generally a whole layer structure, and the orthogonal projection of the first reference electrode layer 2 on the first dielectric substrate 11 completely covers the orthogonal projection of the feed structure 32 on the first dielectric substrate 11. In the embodiments of the present disclosure, the first reference electrode layer 2 on the feed structure 32 is etched, such that the orthogonal projection of the first reference electrode layer 2 on the first dielectric substrate 11 is not overlapped with the orthogonal projection of the feed structure 32 on the first dielectric substrate 11.

Illustratively, as shown in FIG. 16, a seventh via Via7 is defined in the first reference electrode layer 2, and the seventh via Via7 extends through the first reference electrode layer 2 in the thickness direction of the first reference electrode layer 2. A great via slot is formed by connecting the seventh via Via7 and the second via Via2, and an orthogonal projection of the via slot on the first dielectric layer 31 covers the orthogonal projection of the feed structure 32 on the first dielectric substrate 11, such that the energy input performance is improved.

It should be noted that the antenna shown in FIG. 16 is applicable to any of the above embodiments (including the first example to the sixteenth example), and the repeated descriptions are not described. The seventeenth example and FIG. 16 are schematic diagrams of film layers of the antenna. As shown in FIG. 16, the conductive member 4 is a column with a radius of 0.1 mm, and is coupled and is combined with the structure of the feed structure 32 and the first electrode layer 13 shown in FIG. 7. The orthogonal projection of the first reference electrode layer 2 on the first dielectric substrate 11 is not overlapped with the orthogonal projection of the feed structure 32 on the first dielectric substrate 11.

Figure 17:
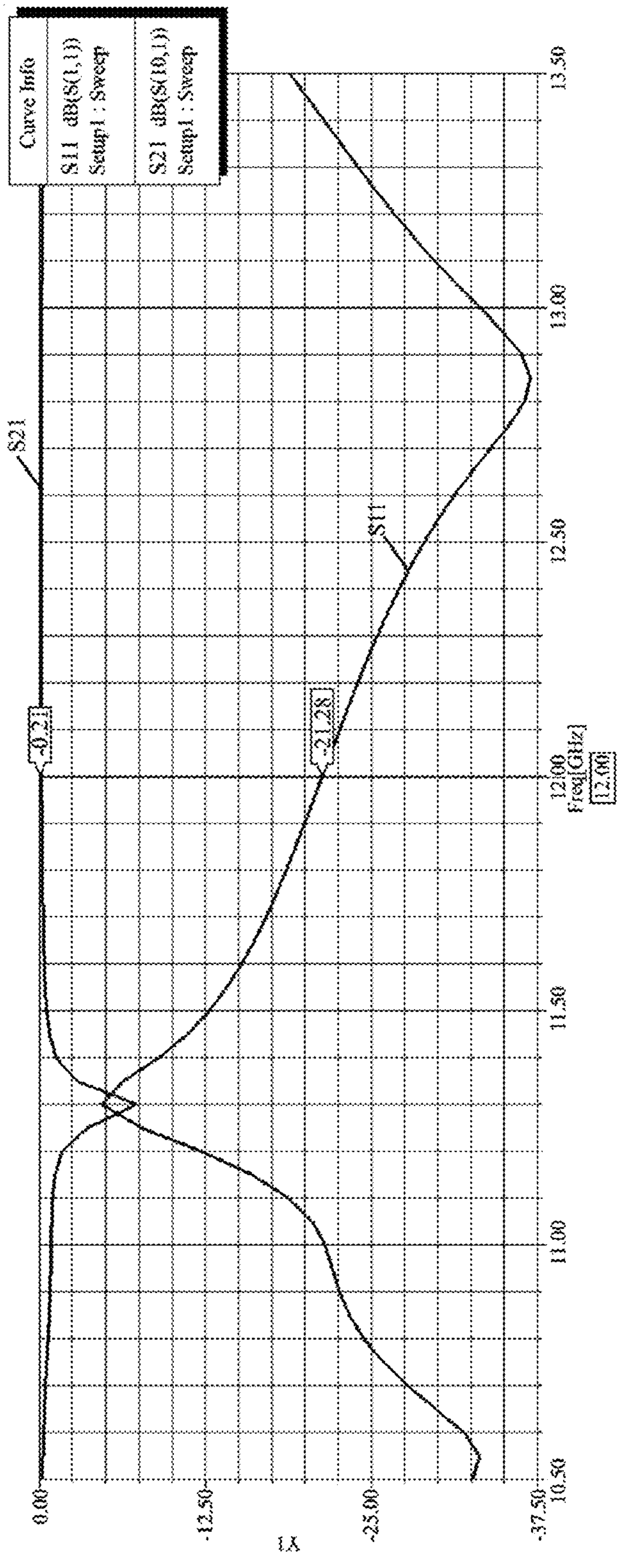
FIG. 17 is a simulation diagram of a parameter S in the structure corresponding to a seventeenth example.

FIG. 17 is a simulation diagram of a parameter S in the structure corresponding to a seventeenth example. As shown in FIG. 17, the power divider for "dividing one into several" is equivalent to a metal line to illustrate by taking the simulation result of one branch circuit 322 and the corresponding phase-shifting structure 1 as an example for reducing the simulation complexity. It can be seen from the simulation result of FIG. 17 that at the resonance point 12 GHz, S11 is equal to −21.28 dB, and S21 is equal to −0.21 dB. Compared with some practices (at the resonance point 12 GHz, S11 is equal to −9.81 dB, and S21 is equal to −1.03 dB), at the same conditions, the energy input performance (S11) is improved in the embodiments of the present disclosure, and the insert loss (S21) is reduced. Compared with the first example, the third example, the fourth example, the fifth example, the ninth example, and the thirteenth example, the energy input performance (S11) is greater in the embodiments of the present disclosure, and the insert loss (S21) is less.

Figure 18:
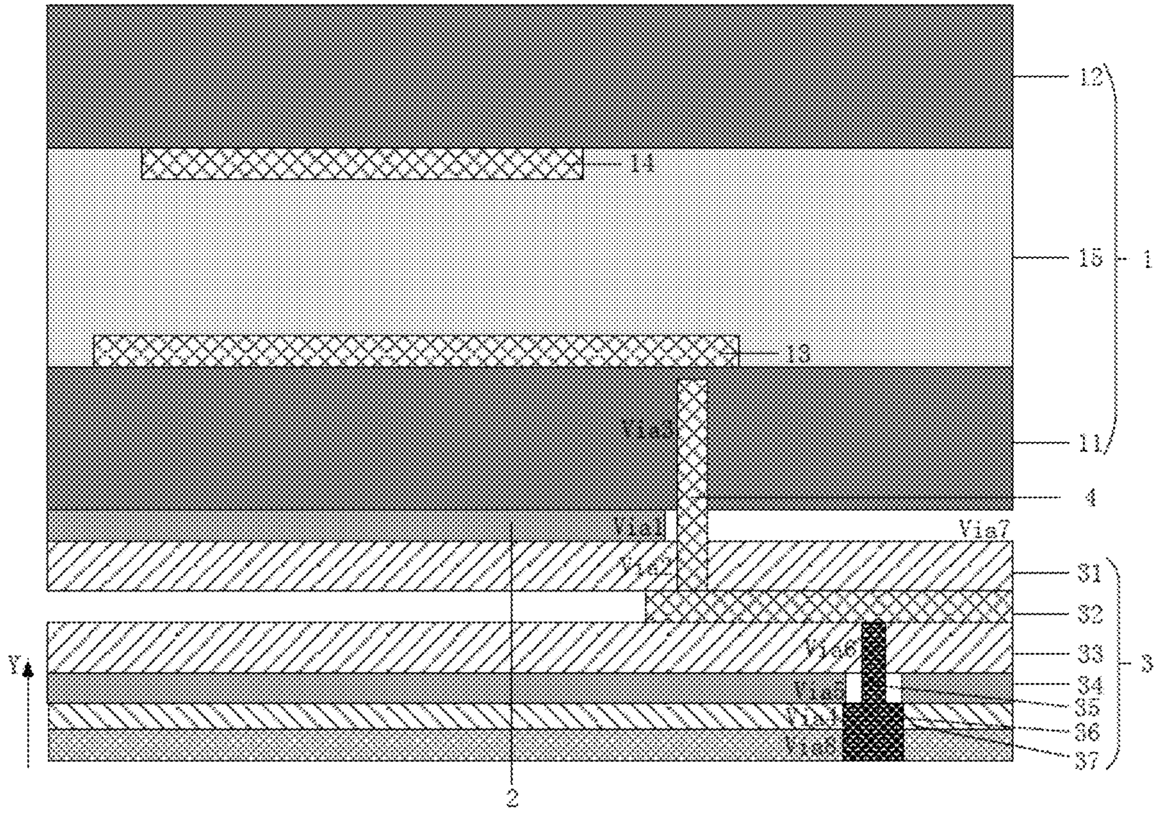
FIG. 18 is a schematic diagram of detailed film layers of an antenna according to some embodiments of the present disclosure.

In some embodiments, FIG. 18 is a schematic diagram of detailed film layers of an antenna according to some embodiments of the present disclosure. As shown in FIG. 18, the feed substrate 3 further includes a third dielectric layer, a connection portion 35, and a feed source 36. The third dielectric layer is disposed on a side, facing away from the second dielectric layer 33, of the second reference electrode layer 34, and a fourth via Via4 is defined in the third dielectric layer. The feed source 36 is disposed in the fourth via Via4, and is electrically connected to the connection portion 35. The connection portion is electrically connected to the main circuit 321 by extending through a fifth via Via5 in the second reference electrode layer 34 and a sixth via Via6 in the second dielectric layer 33.

As shown in FIG. 18, a reflective layer 38 (also referred to as a BR layer) is disposed on a side, facing away from the second reference electrode layer 34, of the third dielectric layer, and an eighth via Via8 is defined in the reflective layer 38. The feed source 36 is disposed in the fourth via Via4 and the eighth via Via8. The reflective layer 38 is configured to reflect the signal to improve the strength of the signal.

Illustratively, as shown in FIG. 18, in the embodiments of the present disclosure, a thickness of the first reference electrode layer 2 is 18 μm, a thickness of the first dielectric layer 31 is 0.508 μm, a thickness of the second dielectric layer 33 is 0.058 μm, a thickness of the second reference electrode layer 34 is 18 μm, and a thickness of the feed structure 32 is 18 μm. Materials of the first reference electrode layer 2, the second reference electrode layer 34, and the feed structure 32 include copper (Cu), and materials of the feed source 36 and the connection portion 35 include a shape memory polymer (SMP).

Figure 19:
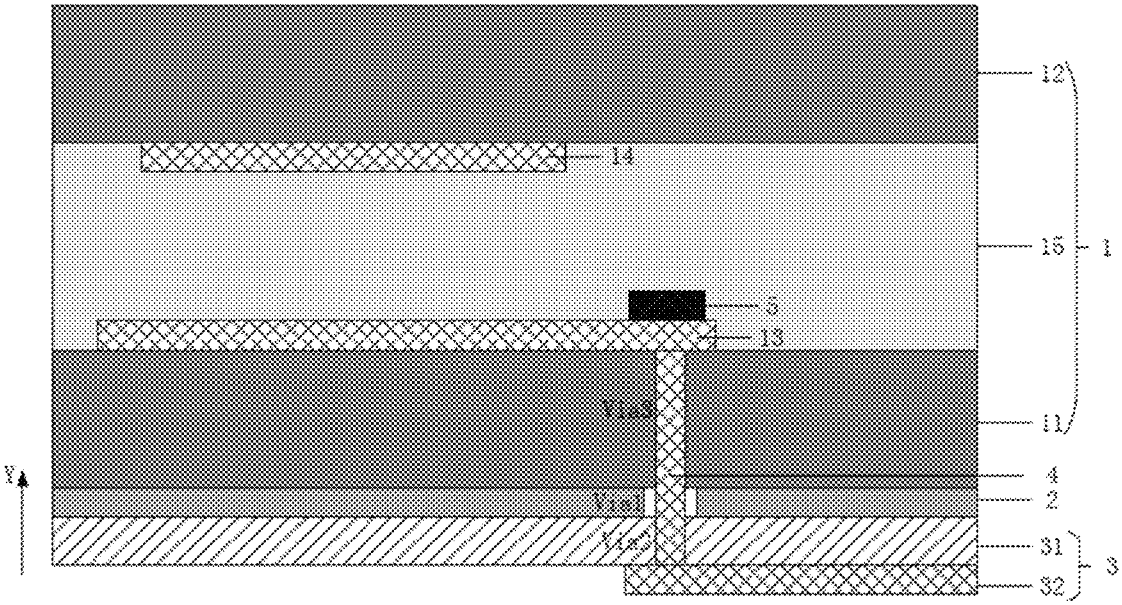
FIG. 19 is a schematic diagram of partial film layers of an antenna according to some embodiments of the present disclosure.

In some embodiments, FIG. 19 is a schematic diagram of partial film layers of an antenna according to some embodiments of the present disclosure. As shown in FIG. 19, the antenna further includes a package structure 5. The package structure 5 is disposed on a side, proximal to the tunable dielectric layer 15, of the first electrode layer 13, and an orthogonal projection of the package structure 5 on the first dielectric substrate 11 covers an orthogonal projection of the conductive member 4 on the first dielectric substrate 11.

The embodiments are combined in any one of the above embodiments. Illustratively, in the case that the whole structure is unchanged, a third via Via3 is defined in the first dielectric substrate 11 (the glass substrate) and is filled with the metal to form a first conductive portion 41. The package structure 5 is disposed on a projection position of the first conductive portion 41 on the side, facing away from the first dielectric substrate 11, of the first electrode layer 13, for example, a package adhesive. The coverage of the package adhesive can efficiently reduce the pressure of the liquid crystal on the third via Via3 to avoid the failure of the device caused by the open of the third via Via3.

The embodiments of the present disclosure further provide an electronic device. The electronic device includes the antenna according to any of the above embodiments. The electronica device is any product with the signal receiving and sending function, such as, a mobile phone, a tablet computer, a television, a monitor, a laptop computer, a digital photo frame, and a vehicle-mounted device. The other necessary assemblies of the electronic device are understood by those skilled in the art, which are not repeated herein and are not constructed as the limitation of the present disclosure.

In some embodiments, the antenna in the electronic device further includes a transceiver unit, a radio frequency transceiver, a signal amplifier, a power amplifier, and a filter unit. The antenna in the communication device is a sending antenna or a receiving antenna. The transceiver unit includes a base band and a receiving end. The base band provides at least one frequency band signal, such as 2G signal, 3G signal, 4G signal, 5G signal, and the like, and sends at least one frequency band signal to the radio frequency transceiver. Upon receiving the signal, the antenna in the communication system transmits the signal to the receiving end of the transceiver unit upon processing by the filter unit, the power amplifier, the signal amplifier, and the radio frequency transceiver, and the receiving end is a smart gateway.

Furthermore, the radio frequency transceiver is connected to the transceiver unit for modulating the signal sent by the transceiver unit or demodulating the signal received by the antenna and transmitting the signal back to the transceiver unit. Specifically, the radio frequency transceiver includes a transmitting circuit, a receiving circuit, a modulation circuit, and a demodulation circuit. After the transmitting circuit receives various types of signals provided by the baseband, the modulation circuit modulates various types of signals provided by the baseband and then sends to the antenna. The antenna receives the signal and transmits to the receiving circuit of the radio frequency transceiver, the receiving circuit transmits the signal to the demodulation circuit, and the demodulation circuit demodulates the signal and then transmits to the receiving end.

Furthermore, the radio frequency transceiver is connected to the signal amplifier and the power amplifier, and the signal amplifier and the power amplifier are connected to the filter unit, and the filter unit is connected to at least one antenna. In sending signals by the communication system, the signal amplifier is used to improve the signal-to-noise ratio of the signals output by the radio frequency transceiver and then transmit to the filter unit. The power amplifier is used to amplify the power of the signal output by the radio frequency transceiver and then transmit to the filter unit. The filter unit specifically includes a duplexer and a filter circuit. The filter unit combines the signals output by the signal amplifier and the power amplifier, filters the noise wave and transmits to the antenna, and the antenna radiates the signal. In receiving signals by the communication system, the antenna transmits the signals to the filter unit upon receiving the signals, and the filter unit filters the noise wave from the signals received by the antenna and transmits to the signal amplifier and the power amplifier, and the signal amplifier gains the signals received by the antenna to increase the signal-to-noise ratio of the signals. The power amplifier amplifies the power of the signal received by the antenna. The signal received by the antenna is processed by the power amplifier and signal amplifier and transmits to the radio frequency transceiver, and the radio frequency transceiver then transmits to the transceiver unit.

In some embodiments, the signal amplifier includes various types of signal amplifiers, such as a low noise amplifier, which is not limited herein.

In some embodiments, the antenna in the embodiments of the present disclosure further includes a power management unit, and the power management unit is connected to the power amplifier to provide the voltage with amplified signal for the power amplifier.

It can be understood that the above embodiments are exemplary embodiments for illustrating the principles of the present disclosure, and should not be construed as limiting the present disclosure. A person of ordinary skill in the art can obtain variations and improvements without departing from the spirit or essence of the present disclosure, the variations and improvements are within the scope of the protection of the present disclosure.

The invention claimed is:

1. An antenna, comprising: at least one phase-shifting structure, a first reference electrode layer, and a feed substrate, wherein each of the at least one phase-shifting structure comprises a first dielectric substrate and a second dielectric substrate that are opposite to each other, and a first electrode layer, a second electrode layer, and a tunable dielectric layer that are disposed between the first dielectric substrate and the second dielectric substrate, wherein the tunable dielectric layer is disposed between the first electrode layer and the second electrode layer;

the first reference electrode layer is disposed on a side, facing away from the tunable dielectric layer, of the first dielectric substrate, and a first via is defined in the first reference electrode layer;

the feed substrate comprises a first dielectric layer and a feed structure, wherein the first dielectric layer is disposed on a side, facing away from the tunable dielectric layer, of the first reference electrode layer, the feed structure is disposed on side, facing away from the first reference electrode layer, of the first dielectric layer, and a second via extending through in a thickness direction of the first dielectric layer is defined in the first dielectric layer; and the antenna further comprises a conductive member, wherein the feed structure comprises a main circuit and at least one branch circuit electrically connected to the main circuit, one of the at least one branch circuit is electrically connected to the conductive member, the conductive member is electrically connected to the first electrode layer through the first via, the second via, and a third via, wherein the third via extends through at least part of a thickness of the first dielectric substrate in a thickness direction of the first dielectric substrate.

2. The antenna according to claim 1, wherein the third via extends through the first dielectric substrate, the first electrode layer is disposed on a side, proximal to the tunable dielectric layer, of the first dielectric substrate, and the conductive member is directly connected to the first electrode layer by extending through the first via, the second via, and the third via.

3. The antenna according to claim 1, wherein the third via extends through a part of the first dielectric substrate, the first electrode layer is disposed on a side, proximal to the tunable dielectric layer, of the first dielectric substrate, and the conductive member is coupled to the first electrode layer by extending through the first via, the second via, and the third via.

4. The antenna according to claim 3, wherein in a depth direction of the third via, a thickness of a portion of the first dielectric substrate not extended through by the third via ranges from 1.5 μm to 2.5 μm.

5. The antenna according to claim 1, wherein the branch circuit comprises a first body portion and a first end portion electrically connected to the conductive member, and the first electrode layer comprises a second body portion and a second end portion electrically connected to the conductive member, wherein a width of a section of the first end portion perpendicular to the first dielectric substrate decreases monotonically in a direction from the first body portion to the first end portion; or a width of a section of the second end portion perpendicular to the first dielectric substrate decreases monotonically in a direction from the second body portion to the second end portion.

6. The antenna according to claim 5, wherein an orthogonal projection of the first end portion on the first dielectric substrate covers an orthogonal projection of the conductive member on the first dielectric substrate, and an outline of the orthogonal projection of the conductive member on the first dielectric substrate falls within an outline of the orthogonal projection of the first end portion on the first dielectric substrate; or an orthogonal projection of the second end portion on the first dielectric substrate covers an orthogonal projection of the conductive member on the first dielectric substrate, and an outline of the orthogonal projection of the conductive member on the first dielectric substrate falls within an outline of the orthogonal projection of the second end portion on the first dielectric substrate.

7. The antenna according to claim 1, wherein an orthogonal projection of each of the at least one branch circuit on the first dielectric substrate covers an orthogonal projection of the conductive member on the first dielectric substrate, and an orthogonal projection of the first electrode layer on the first dielectric substrate covers the orthogonal projection of the conductive member on the first dielectric substrate; and for a remaining portion, other than a portion connected to the main circuit, of the each of the at least one branch circuit, a width of a section of the remaining portion perpendicular to the first dielectric substrate is uniform, or, a width of a section of the first electrode layer perpendicular to the first dielectric substrate is uniform.

8. The antenna according to claim 7, wherein the conductive member comprises a first conductive portion and a second conductive portion that are electrically connected, wherein the first conductive portion is disposed in the third via of the first dielectric substrate, the second conductive portion is disposed in the first via and the second via, and a width of a section of the first conductive portion perpendicular to the first dielectric substrate increases monotonically in a direction from the second dielectric substrate to the first dielectric substrate.

9. The antenna according to claim 8, wherein the first conductive portion comprises a first surface and a second surface that are opposite to each other in a thickness direction of the first conductive portion, wherein the first surface is closer to the first dielectric substrate than the second surface, an orthogonal projection of the second surface on the first dielectric substrate covers an orthogonal projection of the first surface on the first dielectric substrate, and a proportion of an area of the first surface and an area of the second surface ranges from 0.125 to 0.375.

10. The antenna according to claim 9, wherein the second conductive portion comprises a third surface and a fourth surface that are opposite to each other in a thickness direction of the second conductive portion, wherein the third surface is closer to the first conductive portion than the fourth surface, the third surface is connected to the second surface, and an orthogonal projection of the third surface is coincident with the orthogonal projection of the second surface.

11. The antenna according to claim 7, wherein the conductive member comprises a first conductive portion and a second conductive portion that are electrically connected, wherein the first conductive portion is disposed in the third via of the first dielectric substrate, the second conductive portion is disposed in the first via and the second via, and a width of a section of the first conductive portion perpendicular to the first dielectric substrate decreases monotonically in a direction from the second dielectric substrate to the first dielectric substrate.

12. The antenna according to claim 11, wherein the first conductive portion comprises a first surface and a second surface that are opposite to each other in a thickness direction of the first conductive portion, wherein the first surface is closer to the first dielectric substrate than the second surface, an orthogonal projection of the first surface on the first dielectric substrate covers an orthogonal projection of the second surface on the first dielectric substrate, and a proportion of an area of the second surface and an area of the first surface ranges from 0.125 to 0.375.

13. The antenna according to claim 12, wherein the second conductive portion comprises a third surface and a fourth surface that are opposite to each other in a thickness direction of the second conductive portion, wherein the third surface is closer to the first conductive portion than the second surface, the third surface is connected to the second surface, and an orthogonal projection of the third surface on the first dielectric substrate covers the orthogonal projection of the second surface on the first dielectric substrate.

14. The antenna according to claim 7, wherein the conductive member comprises a first conductive portion and a second conductive portion that are electrically connected, wherein the first conductive portion is disposed in the third via of the first dielectric substrate, the second conductive portion is disposed in the first via and the second via, the first conductive portion comprises a first conductive sub-portion and a second conductive sub-portion, and the first conductive portion is closer to the first electrode layer than the second conductive portion, wherein a width of a section of the first conductive sub-portion perpendicular to the first dielectric substrate decreases monotonically in a direction from the second dielectric substrate to the first dielectric substrate, or a width of a section of the second conductive sub-portion perpendicular to the first dielectric substrate increases monotonically in a direction from the second dielectric substrate to the first dielectric substrate.

15. The antenna according to claim 14, wherein the first conductive sub-portion comprises a first surface and a fifth surface that are opposite to each other in a thickness direction of the first conductive sub-portion, wherein the first surface is closer to the first dielectric substrate than the fifth surface; and the second conductive sub-portion comprises a sixth surface and a second surface that are opposite to each other in a thickness direction of the second conductive sub-portion, wherein the sixth surface is closer to the first dielectric substrate than the second surface; wherein an orthogonal projection of the first surface on the first dielectric substrate covers an orthogonal projection of the fifth surface on the first dielectric substrate, and a proportion of an area of the fifth surface and an area of the first surface ranges from 0.125 to 0.375; or an orthogonal projection of the second surface on the first dielectric substrate covers an orthogonal projection of the sixth surface on the first dielectric substrate, and a proportion of an area of the sixth surface and an area of the second surface ranges from 0.125 to 0.375.

16. The antenna according to claim 15, wherein the second conductive portion comprises a third surface and a fourth surface that are opposite to each other in a thickness direction of the second conductive portion, wherein the third surface is closer to the first conductive portion than the fourth surface, the third surface is connected to the second surface, and an orthogonal projection of the third surface is coincident with the orthogonal projection of the second surface.

17. The antenna according to claim 7, wherein the feed substrate further comprises a second dielectric layer on a side, facing away from the first dielectric layer, of the feed structure and a second reference electrode layer on a side, facing away from the feed structure, of the second dielectric layer, wherein an orthogonal projection of the first reference electrode layer on the first dielectric substrate is not overlapped with an orthogonal projection of the feed structure on the first dielectric substrate.

18. The antenna according to claim 17, wherein the feed substrate further comprises a third dielectric layer, a connection portion, and a feed source, wherein the third dielectric layer is disposed on a side, facing away from the second dielectric layer, of the second reference electrode layer, and a fourth via is defined in the third dielectric layer;

the feed source is disposed in the fourth via, and is electrically connected to the connection portion; and the connection portion is electrically connected to the main circuit by extending through a fifth via in the second reference electrode layer and a sixth via in the second dielectric layer.

19. The antenna according to claim 1, wherein a width of the first via is greater than a width of the conductive member, and a width of the second via and a width of the third via are equal to the width of the conductive member.

20. An electronic device, comprising: an antenna, wherein the antenna comprises: at least one phase-shifting structure, a first reference electrode layer, and a feed substrate, wherein each of the at least one phase-shifting structure comprises a first dielectric substrate and a second dielectric substrate that are opposite to each other, and a first electrode layer, a second electrode layer, and a tunable dielectric layer that are disposed between the first dielectric substrate and the second dielectric substrate, wherein the tunable dielectric layer is disposed between the first electrode layer and the second electrode layer;

the first reference electrode layer is disposed on a side, facing away from the tunable dielectric layer, of the first dielectric substrate, and a first via is defined in the first reference electrode layer;

the feed substrate comprises a first dielectric layer and a feed structure, wherein the first dielectric layer is disposed on a side, facing away from the tunable dielectric layer, of the first reference electrode layer, the feed structure is disposed on side, facing away from the first reference electrode layer, of the first dielectric layer, and a second via extending through in a thickness direction of the first dielectric layer is defined in the first dielectric layer; and the antenna further comprises a conductive member, wherein the feed structure comprises a main circuit and at least one branch circuit electrically connected to the main circuit, one of the at least one branch circuit is electrically connected to the conductive member, the conductive member is electrically connected to the first electrode layer through the first via, the second via, and a third via, wherein the third via extends through at least part of a thickness of the first dielectric substrate in a thickness direction of the first dielectric substrate.

* * * * *